US012743924B2

(12) United States Patent
Boese et al.

(10) Patent No.: US 12,743,924 B2

(45) Date of Patent: Sep. 22, 2026

(54) ADJUSTABLE GAME PLAY MATRIX SYSTEMS AND METHODS IN ELECTRONIC GAMING

(71) Applicant: Aristocrat Technologies, Inc., Las Vegas, NV (US)

(72) Inventors: Eric Boese, Decatur, GA (US); Jae Yi, Alpharetta, GA (US); Brandon Richard, Lawrenceville, GA (US)

(73) Assignee: Aristocrat Technologies, Inc., Las Vegas, NV (US)

(*) Notice: Subject to any disclaimer, the term of this patent is extended or adjusted under 35 U.S.C. 154(b) by 292 days.

(21) Appl. No.: 18/472,964

(22) Filed: Sep. 22, 2023

(65) Prior Publication Data

US 2025/0005995 A1 Jan. 2, 2025

Related U.S. Application Data

(60) Provisional application No. 63/511,334, filed on Jun. 30, 2023.

(51) Int. Cl.
*G07F 17/32* (2006.01)

(52) U.S. Cl.
CPC ...... *G07F 17/3213* (2013.01); *G07F 17/3267* (2013.01)

(58) Field of Classification Search
CPC ......................... G07F 17/3213; G07F 17/3267
See application file for complete search history.

(56) References Cited

U.S. PATENT DOCUMENTS

| | | | | |
|---|---|---|---|---|
| 4,615,013 A * | 9/1986 | Yan | G06T 15/04 | 345/428 |
| 4,790,537 A * | 12/1988 | Smyth | G07F 17/3244 | 273/143 R |
| 6,544,120 B2 * | 4/2003 | Ainsworth | G07F 17/34 | 273/138.2 |
| 8,002,624 B2 * | 8/2011 | Paulsen | G07F 17/3211 | 463/31 |
| 8,834,258 B2 * | 9/2014 | Gobe | G07F 17/3209 | 463/31 |
| 8,858,320 B2 * | 10/2014 | Kadode | G07F 17/34 | 463/31 |
| 9,552,704 B2 * | 1/2017 | Poole | G07F 17/326 | |
| 10,157,516 B2 * | 12/2018 | Hendricks | G07F 17/32 | |
| 10,453,302 B2 | 10/2019 | Montenegro | | |

(Continued)

*Primary Examiner* — Xuan M Thai
*Assistant Examiner* — Shauna-Kay Hall
(74) *Attorney, Agent, or Firm* — Armstrong Teasdale LLP

(57) ABSTRACT

An electronic gaming system including a memory and a processor is described. The processor is configured to cause display of an adjustable game play matrix including a plurality of reels. A first column of the adjustable game play matrix includes a first predefined number of reels. The processor is also configured to randomly determine a first number of symbols to display on the first column for a first instance of an electronic game, randomly determine a first plurality of symbols corresponding to the first number of symbols, and select a first size, of a plurality of sizes, for each symbol of the first plurality of symbols to generate a sized first plurality of symbols. The processor is also configured to adjust display of the reels on the first column and cause display of the sized first plurality of symbols at a first number of the first predefined number of reels.

19 Claims, 22 Drawing Sheets

(56) References Cited

U.S. PATENT DOCUMENTS

| | | | | |
|---|---|---|---|---|
| 11,270,552 | B1 | 3/2022 | Delekta | |
| 11,450,181 | B2 | 9/2022 | Uberuaga | |
| 11,468,741 | B2 * | 10/2022 | Nelson | G07F 17/326 |
| 2008/0090636 | A1 * | 4/2008 | Lathrop | G07F 17/34 463/20 |
| 2008/0132322 | A1 * | 6/2008 | Yoshizawa | G07F 17/32 463/20 |
| 2008/0287178 | A1 * | 11/2008 | Berman | G07F 17/3211 463/20 |
| 2011/0136562 | A1 * | 6/2011 | Loat | G07F 17/3267 463/20 |
| 2012/0083327 | A1 * | 4/2012 | Zobel | G07F 17/3213 463/20 |
| 2013/0065663 | A1 * | 3/2013 | Johnson | G07F 17/3213 463/20 |
| 2014/0162749 | A1 * | 6/2014 | Ryan | G07F 17/3213 463/20 |
| 2015/0302705 | A1 * | 10/2015 | Johnson | G07F 17/3213 463/20 |
| 2015/0348363 | A1 * | 12/2015 | Johnson | G07F 17/3213 463/20 |
| 2016/0093152 | A1 * | 3/2016 | Hendricks | G07F 17/34 463/21 |
| 2016/0125693 | A1 * | 5/2016 | Berman | G07F 17/3267 463/21 |
| 2016/0335842 | A1 * | 11/2016 | Zoble | G07F 17/3213 |
| 2017/0365127 | A1 * | 12/2017 | Zoble | G07F 17/34 |
| 2019/0051099 | A1 * | 2/2019 | Pawloski | G07F 17/3211 |
| 2022/0335776 | A1 * | 10/2022 | Mirjavadi | G07F 17/3213 |
| 2024/0242561 | A1 * | 7/2024 | Mirjavadi | G07F 17/3213 |

* cited by examiner

ADJUSTABLE GAME PLAY MATRIX SYSTEMS AND METHODS IN ELECTRONIC GAMING

CROSS-REFERENCE TO RELATED APPLICATIONS

This application claims the benefit of priority to U.S. Provisional Patent Application No. 63/511,334, filed Jun. 30, 2023, the contents of which are incorporated herein by reference in their entirety.

TECHNICAL FIELD

The field of disclosure relates generally to electronic gaming, and more specifically, to adjustable game play matrices and metamorphic features including metamorphic upgrades to outputted awards in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Currently, certain challenges arise when positioning information on a display (e.g., screen) of an EGM or other gaming device. Display space is limited and sought-after. For example, some electronic games include columns that vertically expand and take up additional display space when displaying additional symbols during play. As the columns vertically expand, there is less space available to display information. Thus, improvements in the way in which game play matrix columns are displayed are desired.

Additionally, there are currently limited ways for players of electronic games to access specific features (e.g., a grand jackpot) and upgrades within electronic games. For example, some electronic games only allow access to a specific feature via a specific triggering event, and do not provide multiple ways to access features and/or upgrades. Thus, improvements in the way in which features and upgrades are accessed in electronic games are desired.

BRIEF DESCRIPTION

In one aspect, an electronic gaming device including at least one memory device for storing computer executable instructions and at least one processor in communication with the at least one memory device is described. The instructions, when executed by the at least one processor, cause the at least one processor to cause display of an adjustable game play matrix including a plurality of reels, each reel of the plurality of reels being an adjustable display position for displaying symbols of various size. A first column of the adjustable game play matrix includes a first predefined number of reels. The instructions also cause the at least one processor to randomly determine a first number of symbols to display on the first column for a first instance of an electronic game. The first number of symbols is different from the first predefined number of reels. The instructions also cause the at least one processor to randomly determine a first plurality of symbols corresponding to the first number of symbols. Each symbol of the first plurality of symbols is independently determined. The instructions also cause the at least one processor to select a first size, of a plurality of sizes, for each symbol of the first plurality of symbols to generate a sized first plurality of symbols. The first size corresponds to the first number of symbols. The instructions also cause the at least one processor to adjust display of the reels on the first column by adjusting a height of a first number of the first predefined number of reels to receive the sized first plurality of symbols and cause display of the sized first plurality of symbols at the first number of the first predefined number of reels.

In another aspect, at least one non-transitory computer-readable storage medium with instructions stored thereon is described. The instructions, in response to execution by at least one processor, cause the at least one processor to cause display of an adjustable game play matrix including a plurality of reels, each reel of the plurality of reels being an adjustable display position for displaying symbols of various size. A first column of the adjustable game play matrix includes a first predefined number of reels. The instructions also cause the at least one processor to randomly determine a first number of symbols to display on the first column for a first instance of an electronic game. The first number of symbols is different from the first predefined number of reels. The instructions also cause the at least one processor to randomly determine a first plurality of symbols corresponding to the first number of symbols. Each symbol of the first plurality of symbols is independently determined. The instructions also cause the at least one processor to select a first size, of a plurality of sizes, for each symbol of the first plurality of symbols to generate a sized first plurality of symbols. The first size corresponds to the first number of symbols. The instructions also cause the at least one processor to adjust display of the reels on the first column by adjusting a height of a first number of the first predefined number of reels to receive the sized first plurality of symbols and cause display of the sized first plurality of symbols at the first number of the first predefined number of reels.

In yet another aspect, a method of electronic gaming implemented by at least one processor in communication with at least one memory is described. The method includes causing display of an adjustable game play matrix including a plurality of reels, each reel of the plurality of reels being an adjustable display position for displaying symbols of various size. A first column of the adjustable game play matrix includes a first predefined number of reels. The method also includes randomly determining a first number of symbols to display on the first column for a first instance of an electronic game. The first number of symbols is different from the first predefined number of reels. The method also includes randomly determining a first plurality of symbols corresponding to the first number of symbols. Each symbol of the first plurality of symbols is independently determined. The method also includes selecting a first size, of a plurality of sizes, for each symbol of the first plurality of symbols to generate a sized first plurality of symbols. The first size corresponds to the first number of symbols. The method also includes adjusting display of the reels on the first column by adjusting a height of a first number of the first predefined number of reels to receive the sized first plurality of symbols and causing display of the sized first plurality of symbols at the first number of the first predefined number of reels.

DETAILED DESCRIPTION

Figure 1:
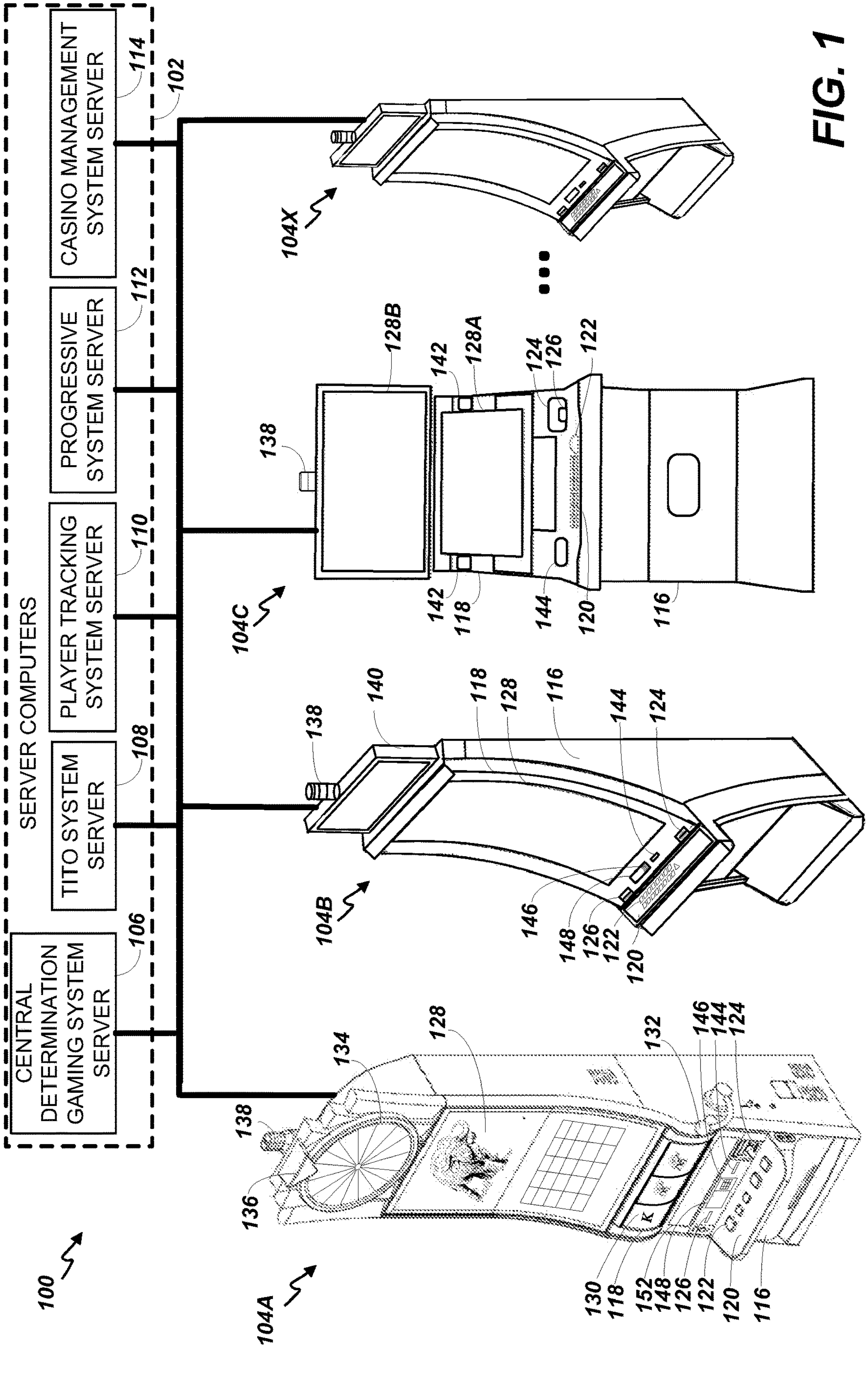
FIG. 1 is an exemplary diagram showing several EGMs networked with various gaming related servers.

The systems and methods described herein relate generally to electronic gaming and more particularly, to electronic gaming devices (e.g., electronic gaming machines) with a max power reels feature (e.g., where each column within an adjustable game play matrix varies in displaying from three to six symbols on each base game spin). In some embodiments, the number of symbols being displayed on each column of the adjustable game play matrix is between 1 and n, where n is a real number. The size of the symbols displayed on each column changes based on the number of symbols displayed on the column. For example, symbols displayed on a column that displays six symbols may be displayed smaller than symbols displayed on a column that displays three symbols.

In the example embodiment, a base game symbol set may include cash on reel ("COR") symbols or some other designated value symbol. In some embodiments, when landing each COR symbol or value symbol during the base game, a random determination is made by a controller of whether a bonus game should be initiated (e.g., such that landing each COR provides a chance to initiate a bonus game). The bonus game includes a hold and spin feature where some symbols (e.g., symbols of a specific type) on a game play matrix are persistently displayed (e.g., "held"), while other symbols are changed. In some embodiments, when landing a specific number (e.g., 3) of CORs in the base game (e.g., as part of the displayed symbols of the base game), the bonus game is triggered.

When transitioning from the base game to the bonus game, the current displayed symbols of the base game (e.g., the current game play matrix configuration) are imported into the bonus game, which may be a hold and spin game, and any COR symbols displayed in the base game may remain in the corresponding reels throughout the bonus game. Further, the bonus game includes at least two metamorphic symbols—an upgrade or boost metamorphic symbol and a grand jackpot (e.g., feature) metamorphic symbol, any of which may be triggered when a COR symbol lands when playing the bonus game. The feature associated with the upgrade metamorphic symbol upgrades the output amounts (e.g., the value amounts displayed) associated with the on-screen COR symbols and/or output amounts associated with COR symbols that are on-screen following one or more subsequent instances (e.g., turn or spin) of the bonus game by a random amount that is distributed across all or a subset of the output amounts associated with the displayed COR symbols. The feature associated with the grand jackpot metamorphic symbol triggers an opportunity to win the grand jackpot during the bonus game and/or awards the grand jackpot during the bonus game.

The systems and methods described herein also relate to an electronic game that includes independent symbol determination and dynamic symbol display during each instance (e.g., spin or turn) of the base game. More specifically, the electronic game includes an adjustable game play matrix having columns and rows of reels that display corresponding symbols (e.g., each reel displays one symbol at the end of each instance of the base game). In the example embodiment, between three and six symbols are displayed on each spin within a single column of the game play matrix, and the number of symbols displayed on each column may change with each instance of the base game. For example, for one instance, the first, third, and sixth columns may display two symbols, the second and fourth columns may display four symbols, and the fifth column may display five symbols. In a subsequent instance, the first, second, and third columns may display six symbols, and the third, fourth, and fifth columns may display three symbols. A similar method of dynamic symbol display may also apply to rows of the adjustable game play matrix. The number of symbols displayed following each instance of the electronic game may affect the number of possible paylines or ways in which a player may win a feature and/or award. The dynamic symbol determination and display may be executed according to various processes, examples of which are described below.

Example Embodiment of Dynamic Symbol Determination and Display

In the example embodiment, a controller causes display of an adjustable game play matrix including a plurality of reels. Each reel may be a position within the adjustable game play matrix and each reel may be an adjustable display position for displaying symbols of various size. The adjustable game play matrix may include a first column that includes a first predefined (e.g., nominal, or unadjusted) number of reels (e.g., the first column includes six nominal reels). The first predefined number of reels is generally constant for a column throughout the electronic game, with the number of symbols displayed in a column during the electronic game being equal to or less than the first predefined number of reels. When the number of symbols to display in a column is less than the number of nominal reels, the nominal reels that are not displayed on the adjustable game play matrix are skipped and not spun. In some embodiments, each nominal reel is always spun, but only the symbols corresponding to the displayed nominal reels are displayed on adjustable game play matrix (e.g., the symbols corresponding to the nominal reels that are not displayed are not displayed).

A first number of symbols (e.g., four symbols) to display on the first column for a first instance (e.g., turn or spin) of an electronic game is randomly determined. The first number of symbols (e.g., four) is different from the first predefined number of reels (e.g., six). To compensate for this difference, the controller later adjusts display of the adjustable game play matrix, as further described herein.

A first plurality of symbols corresponding to the first number of symbols is randomly determined. That is, a first plurality of symbols is determined, where the first plurality of symbols includes a number of symbols corresponding to the first number of symbols. Additionally, each symbol of the first plurality of symbols is independently determined. For example, a symbol corresponding to one reel on the first column may be determined independently of all other symbols on the adjustable game play matrix. That is, each symbol corresponding to each reel is determined independently of the other symbols corresponding to the other reels.

A first size, of a plurality of sizes, is selected for each symbol of the first plurality of symbols to generate a sized first plurality of symbols. The first size corresponds to the first number of symbols. For example, if the first plurality of symbols to be displayed in the first column includes six symbols, then each symbol to be displayed will be sized to fill approximately one-sixth of the height of the column. In contrast, if the first plurality of symbols to be displayed in the first column includes four symbols, then each symbol to be displayed will be sized to fill approximately one-fourth of the height of the column. Accordingly, the symbols to be displayed in each respective column are sized according to the number of symbols to be displayed in each respective column, thereby enhancing display of the symbols to the player.

The display of the reels on the first column is adjusted by adjusting a height of a first number of the first predefined number of reels to receive the sized first plurality of symbols. Stated another way, a height of some (e.g., four) of the six nominal reels on the first column is adjusted to receive the sized first plurality of symbols. In the example embodiment, each column of the adjustable game play matrix always includes six nominal reels. However, if fewer than six symbols are to be displayed in the column, then not all of the six nominal reels will have a corresponding symbol to display, and some of the six nominal positions will be shrunk to have no height (e.g., zero size). For example, if only four symbols are to be displayed on a column, then two of the six nominal reels are shrunk to zero height, and the remaining four reel positions are adjusted so that they are each displayed over approximately one-fourth of the height of the column, which corresponds to the height of the corresponding sized symbols to be displayed in that column. In the example embodiment, the adjustment of the height of each displayed reel occurs instantaneously, such that the player is immediately presented with the number of reels that are included (e.g., spinning) in that instance of the electronic game, and the resizing of the reels and/or the symbols is not displayed to the player.

The resized reels are spun during an instance of the electronic game, and each symbol that appears on the resized spinning reels (e.g., during a spinning animation) is sized according to the number of symbols to be displayed in that column. In the example embodiment, a sized symbol to display at each reel at the end of the instance of the electronic game is randomly determined before the animation of the spinning resized reels is displayed to a player. At the end of the display of the spinning reels (e.g., at the end of the instance of the electronic game), the corresponding symbols that were previously determined to be displayed at the end of the instance of the electronic game are displayed at the corresponding reels on the adjustable game play matrix.

Once the first plurality of symbols is resized, the controller causes display of the sized first plurality of symbols at the first number of the first predefined number of reels. For example, if there are four symbols in the first plurality of symbols, then the reels on the first column are resized such that two of the six nominal reels are shrunk to have a height of zero and the remaining four reels are resized to each be displayed over approximately one-fourth of the height of the first column. Then, the four symbols of the first plurality of symbols are displayed at the four reels that each have a height of approximately one-fourth of the height of the first column. This same process may be executed for other columns of the adjustable game play matrix (e.g., the second column, the third column, etc.) and/or for columns of the adjustable game play matrix during subsequent instances of the electronic game.

In some embodiments, the controller may have access to one or more lookup tables stored in one or more databases, and the controller may access the one or more lookup tables when resizing symbols. For example, the database may include a lookup table that includes a full set of symbols (e.g., A for "Ace", K for "King", Q for "Queen", etc.) that are sized for displaying in a column that displays three symbols. For example, the symbols displayed in third or middle column of adjustable game play matrix may have been resized using the lookup table corresponding to symbols that are sized for displaying in a column that displays three symbols. The database may also include lookup tables having full sets of symbols that are sized for displaying in a column that displays four, five, six, or more symbols. For instance, a first lookup table may store symbols associated with a height of ⅓ of a column, a second lookup table may store symbols associated with a height of ¼ of a column, a third lookup table may store symbols associated with a height of ⅕ of a column, and a fourth lookup table may store symbols associated with a height of ⅙ of a column.

In some embodiments, the database includes lookup tables that includes different sizes of the same symbol (e.g., one of the lookup tables may include different sizes of the "Ace" symbol). When resizing symbols, the controller may access the database of lookup tables and select the appropriate size of each symbol to display based on the number of symbols to be displayed in the corresponding column. For example, when resizing the "Ace" symbol at the top of first column, the controller may have searched a lookup table including different sizes of "Ace" symbols for an "Ace" symbol to display in a column that displays four symbols, and selected that size of "Ace" symbol for display in first column. For instance, a lookup table may store all available sizes of the "Ace" symbol (e.g., ⅓ of a column, ¼ of a column, etc.) and, upon a determination to display an "Ace" symbol, that lookup table may be selected and a lookup performed therein to select the appropriately sized "Ace" symbol.

Second Embodiment of Dynamic Symbol Display

In some embodiments, the adjustable game play matrix that is displayed to a player may be based at least in part on a subset of a backend matrix that is generally not displayed to a player. For example, in some embodiments, the adjustable game play matrix of the electronic game generally includes five columns, and each column displays between three and six symbols. The adjustable game play matrix displayed during the electronic game is based on a backend game play matrix that is of a generally constant size (e.g., the backend game play matrix has a constant number of rows and columns). During an instance of the electronic game, all or a subset of the backend game play matrix may be displayed to the player on the adjustable game play matrix. The backend game play matrix generally includes five columns that each include six rows of reels (e.g., each symbol position is its own reel). A symbol may be randomly and independently determined for each reel during each instance of the electronic game. A subset of symbols corresponding to each column of the backend game play matrix may be displayed on the corresponding column of the adjustable game play matrix on during the electronic game.

When determining symbols to display on the reels of the adjustable game play matrix for each instance, a predefined number of symbols (e.g., six symbols) are randomly and independently determined (e.g., each symbol is determined independently of the other symbols) for each column of the backend game play matrix. That is, a symbol is independently and randomly determined for each reel in the backend game play matrix. Then, a subset of the predetermined number of symbols (which may include all of the predetermined number of symbols) for each column of the backend game play matrix is randomly selected for display in the respective column of the adjustable game play matrix in a randomly determined order. That is, for each instance of the electronic game and for each column of the backend game play matrix, a predetermined number of symbols are randomly determined (e.g., six symbols are each randomly determined for each column of the backend game play matrix), and each symbol is randomly determined independently of the other symbols. Then, for each separate column of the backend game play matrix, a randomly determined number of the symbols determined for that specific column of the backend game play matrix are selected for display on the corresponding column of the adjustable game play matrix in a randomly determined order.

For example, for a first column of the backend game play matrix, six symbols may be randomly and independently determined (e.g., one symbol per reel in the first column), and the adjustable game play matrix may include six nominal reels (e.g., corresponding to the number of rows in the backend game play matrix). Then, it may be randomly determined that only three of the six symbols determined for the first column of the backend game play matrix should be displayed on the first column of the adjustable game play matrix in a randomly determined order. Because there are only three symbols to be displayed, larger versions of the three symbols to be displayed are displayed on the adjustable game play matrix, and the displayed positions of the three larger displayed symbols are adjusted such that the larger displayed symbols are displayed across multiple nominal reels on the first column of the adjustable game play matrix in the randomly determined order.

For example, the first symbol displayed on the first column may be displayed across the first and second nominal reels, the second symbol displayed on the first column may be displayed across the third and fourth nominal reels, and the third symbol displayed on the first column may be displayed across the fifth and sixth nominal reels. The other three symbols determined for the first column of the backend game play matrix that are determined not to be displayed on the adjustable game play matrix are not displayed. A similar determination and display process for remaining columns in the adjustable game play matrix is performed independently of the process performed for the first column, with the exception that generally the same predetermined number of symbols (e.g., six symbols) are initially randomly determined for all columns of the backend game play matrix.

In some embodiments, once the controller determines that a number (e.g., three) reels should be displayed in a column of the adjustable game play matrix, then an animation may be displayed that shows the displayed reels spinning, with a symbol displayed on each reel at the end of the instance of the electronic game. The symbol to display on each reel may be determined before the spinning animation is displayed. In some embodiments, the symbols determined for each reel may be displayed on the corresponding reel without display of the spinning animation.

Third Embodiment of Dynamic Symbol Display

In some embodiments, a set of reels (e.g., three to six reels) displayed in each column of the adjustable game play matrix may be selected from a plurality of reel sets, where each reel in each reel set may have a corresponding symbol that is independently determined. For example, for a first column of the adjustable game play matrix, reel sets including three reels, four reels, five reels, and six reels may be randomly determined. Then, one of the randomly determined reel sets may be randomly determined to be displayed on the first column (e.g., by a controller). For example, the reel set that includes four reels may be randomly determined to be displayed on the first column, and the EGM screen displays four reels in the first column of the adjustable game play matrix. Then, the EGM screen may display (i) each of the four reels (of the displayed reel set) spinning during an instance of the electronic game, and (ii) a corresponding symbol at each reel at the end of the instance of the electronic game. Each symbol to display at each reel may be randomly determined independently of the other displayed symbols.

Stated another way, a plurality of reel sets may be "stacked" on top of each other on the first column of the adjustable game play matrix, and the plurality of reel sets are initially not displayed (e.g., are hidden to the player). Then, one of the hidden reel sets is randomly selected for display on the first column. Next, the selected reel set is displayed on the first column, and a symbol corresponding to each reel of the selected reel set is randomly and independently determined for display. An animation is displayed that shows the reels of the selected reel set spinning, and the final symbol displayed at each reel of the selected reel set corresponds to the symbol that was randomly and independently determined to be displayed. The symbol to display on each reel may be determined before the spinning animation is displayed.

Fourth Embodiment of Dynamic Symbol Display

In some embodiments, the set of reels displayed in each column of the adjustable game play matrix may be based on spawned sets of reels corresponding to each column of the adjustable game play matrix. For example, it may be randomly determined (e.g., by a controller) that four reels should be displayed in a first column of the adjustable game play matrix. Then, four reels are displayed in the first column of the adjustable game play matrix (e.g., a new set of reels is spawned or created for each column during each instance of the electronic game, and there is no resizing of the reels). Then, an animation is displayed that shows the four reels spinning, with a symbol displayed on each reel at the end of the instance of the electronic game. The symbol to display on each reel may be determined before the spinning animation is displayed, and the symbol to display on each reel may be randomly determined independently of the other symbols to be displayed. In some embodiments, the controller has access to templates (e.g., stored in a memory) corresponding to possible reel configurations (e.g., three reels in a column, four reels in a column, five reels in a column, six reels in a column, etc.), and selects the appropriate template of reels to display in a column of the adjustable game play matrix.

Aspects Applicable to All Embodiments

In some embodiments, an EGM screen includes a game play matrix display area of generally fixed height in which the adjustable game play matrix is displayed, and larger or smaller versions of the symbols to be displayed are selected to be displayed such that the displayed symbols are generally contained within and distributed across the fixed height of the game play matrix display area. For example, a first column of the adjustable game play matrix may include six reels, and, during one instance of the base game, the first column of the adjustable game play matrix may display only three symbols in three reels (e.g., each symbol position is its own reel). Accordingly, the three displayed symbols are each positioned, sized, and shaped such that they are each displayed over approximately one third of the height of the first column and such that the three displayed symbols fill up the height of the first column.

Notably, while an example embodiment is described herein with respect to an EGM (e.g., an EGM screen), it should be appreciated that online and mobile embodiments are envisioned (e.g., where the embodiments described herein are provided at an end user device (e.g., EUDs)) and the embodiments and improvements described herein apply to all gaming devices.

For a next instance of the electronic game, the first column may display six symbols. That is, each symbol is displayed over approximately one-sixth of the height of the display area of the first column. Thus, as the number of symbols to be displayed on each column changes, larger or smaller versions of the symbols to be displayed are selected to be displayed so that the displayed symbols are generally displayed over an area of fixed vertical height.

Figure 4:
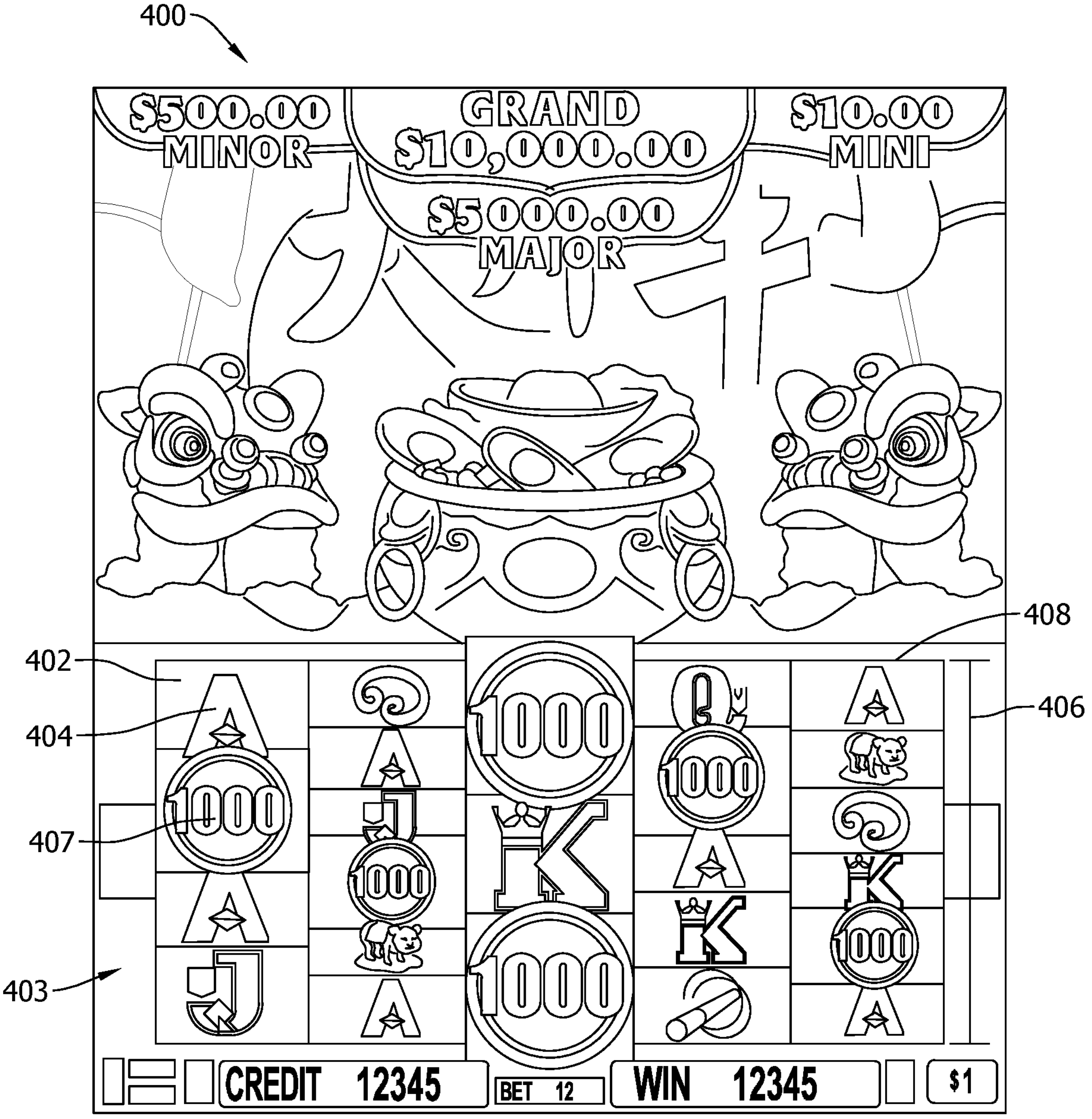
FIG. 4 illustrates an example screenshot and/or interface of an electronic game.
Figure 5:
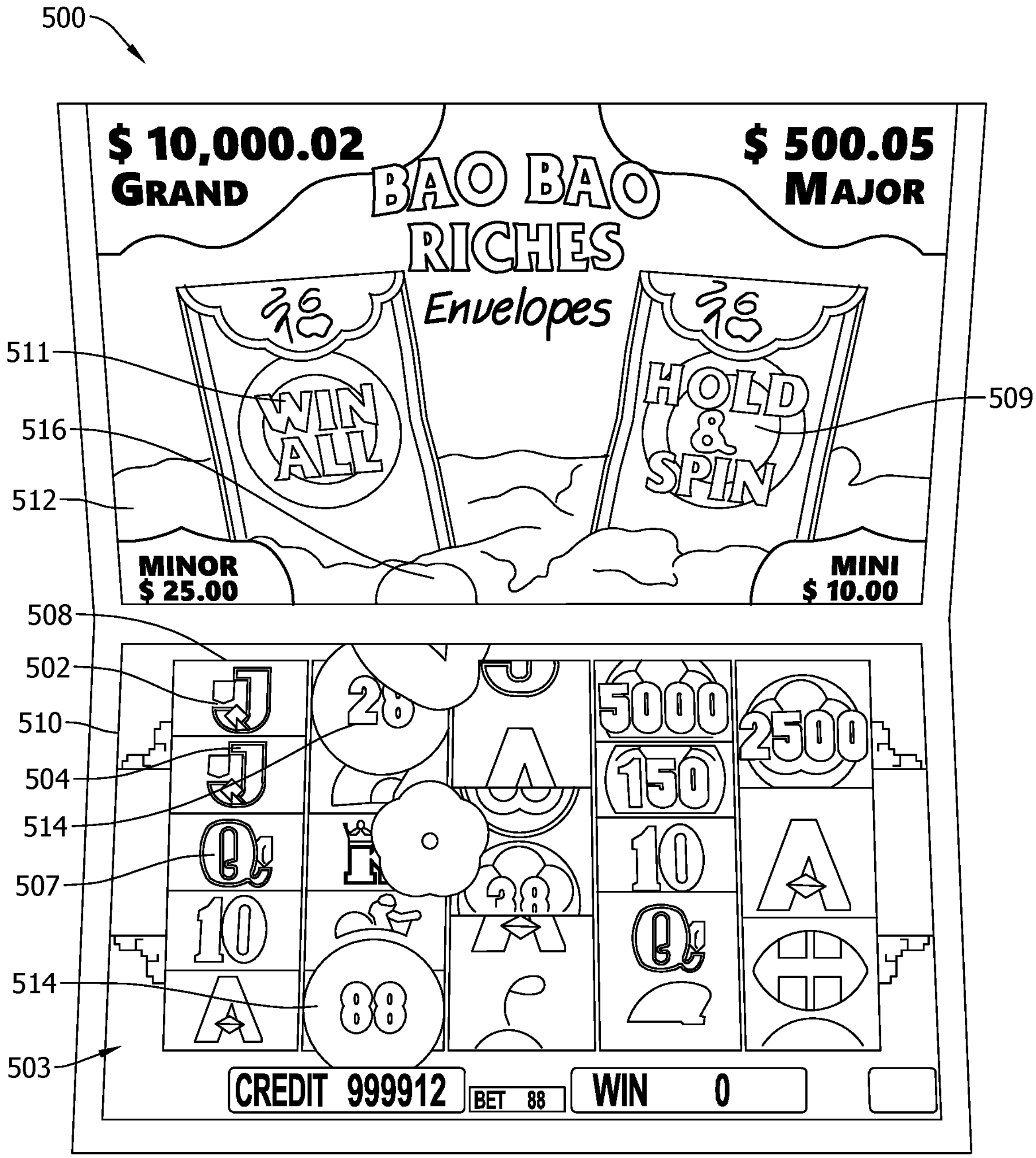
FIG. 5 illustrates another screenshot and/or interface of the electronic game shown in FIG. 4.

As an example of reel heights and symbol sizes being adjusted, see the transition between FIGS. 4 and 5 (thru 7) where different numbers of reels are displayed in different columns for different plays of the electronic game.

In some embodiments, the adjustable game play matrix may include multiple columns. During each instance of the electronic game, each column of the adjustable game play matrix may display a different number of symbols.

In some embodiments, the EGM screen may display multiple adjustable or non-adjustable game play matrices (e.g., depending on the electronic game played). Any game play matrices (e.g., adjustable or non-adjustable) may be displayed in any suitable configuration on EGM screen (or on any other suitable display device).

In some embodiments, the controller may randomly determine that one or more of the reels should be split into multiple sub-reels. If the controller randomly determines that one or more reels should be split into multiple sub-reels, then two or more sub-reels may take the place of the corresponding reel within the adjustable game play matrix (or the backend game play matrix, if applicable), and the controller may randomly determine respective sub-symbols that correspond to the two or more sub-reels. Once the sub-symbols corresponding to the two or more sub-reels are determined, the sub-symbols corresponding to the two or more sub-reels take the place of the corresponding reel within the displayed adjustable game play matrix (or the backend game play matrix, if applicable). With reference to the second embodiment of dynamic symbol display, if the corresponding reel of the backend game play matrix is selected for display on the adjustable game play matrix, then the corresponding sub-symbols are displayed on the adjustable game play matrix.

In some embodiments, sub-symbols corresponding to the two or more sub-reels may be determined independently of each other and/or of all other symbols (e.g., each sub-reel may be its own independently spinning reel). In some embodiments, the sub-symbols corresponding to the two or more sub-reels may be determined dependently of one another (e.g., each two or more sub-reels corresponding to the same reel may collectively be a spinning reel and/or may be tied together in some way).

In some embodiments, the controller may randomly determine to split one or more reels of the adjustable game play matrix (or of the backend game play matrix, if appliable) into multiple sub-reels before, during, or after an instance of the electronic game. If the controller randomly determines that a displayed reel should be split into multiple sub-reels before or during a spin of the base game, then an animation of the multiple sub-reels spinning as a single reel or as independent reels may be displayed on the adjustable game play matrix during the instance, and the displayed symbols may include the randomly determined sub-symbols displayed within the corresponding reel of the adjustable game play matrix.

Figure 16:
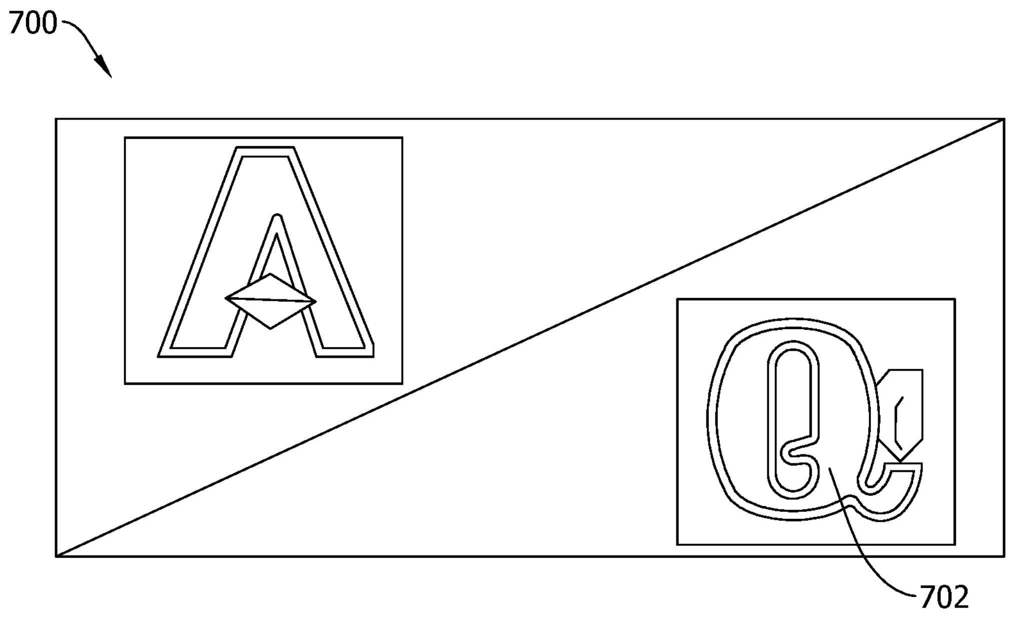
FIG. 16 illustrates an example reel in which two sub-symbols are displayed.

In some embodiments, if the controller randomly determines that a displayed reel should be split into multiple sub-reels after a spin of the base game, then an animation of the reel transitioning to display multiple sub-symbols in respective sub-reels may be displayed in the corresponding reel of the adjustable game play matrix. For example, an animation may show a symbol displayed on a column of the adjustable game play matrix (e.g., as shown in FIG. 4) transitioning to display sub-symbols within the same reel (e.g., as shown in FIG. 16) of the adjustable game play matrix. The symbol displayed before the transition animation and/or the sub-symbols displayed after the transition animation may be used to determine if an award should be presented to a player and/or an amount of an award to be presented to the player.

In some embodiments, if a symbol is randomly determined for a reel, and the controller randomly determines that the reel should be split into multiple sub reels, then the symbol that was originally determined for the reel may affect the determination of corresponding multiple sub-symbols. For example, if the controller randomly determines a COR symbol associated with a credit value of 100 for a reel, and the controller randomly determines that the same reel should be split into multiple sub-reels, then the controller may determine that the sub-symbols corresponding to the sub-reels should be COR symbols that are each associated with credit values that collectively sum to the credit value to which the COR symbol that was initially determined for the reel is associated with (e.g., a COR symbol associated with a credit value of 100 may be split into two sub-symbols that are each COR symbols associated with credit values of 25 and 75, respectively).

In some embodiments, if a symbol is determined for a reel, and the controller randomly determines that the reel should be split into multiple sub-reels, then the sub-symbols corresponding to the sub-reels may be determined independently of the symbol that was originally determined for the corresponding reel.

In some embodiments, the controller may randomly determine if a reel should be split into multiple sub-reels before a corresponding symbol is randomly determined for that reel. For example, the controller may randomly determine that a reel should be split into multiple sub-reels, and then the controller may randomly determine two sub-symbols for the two sub-reels, without determining a symbol for the corresponding reel.

In some embodiments, a probability of the controller randomly determining that a reel should be split into multiple sub-reels may increase when the number of symbols to be displayed on the corresponding column of the adjustable game play matrix is lower than the number of symbols to be displayed on another column of the adjustable game play matrix. For example, if the controller randomly determines that a first column of the adjustable game play matrix should display five symbols and a second column of adjustable game play matrix should display three symbols, then the probability that a reel to be displayed on the second column is split into multiple sub-reels may be higher than that of first column. That is, preference of which column of the adjustable game play matrix should display multiple sub-symbols instead of one symbol on a reel may be given to columns of the adjustable game play matrix that are randomly determined to display fewer symbols. Accordingly, each of the sub-symbols may be displayed over a larger area of a column of the adjustable game play matrix, which facilitates easier viewing by a player.

In some embodiments, if the controller randomly determines that one or more displayed symbols of an instance of a base game should be split into multiple sub-reels (with corresponding sub-symbols) and if the controller randomly determines that a bonus game should be initiated (e.g., based on a COR symbol present in the displayed symbols), then the multiple sub-reels may be carried into the game play matrix of the bonus game, such that the bonus game is played using the multiple sub-reels in place of the corresponding reel in the game play matrix of the bonus game.

In some embodiments, each column of the adjustable game play matrix may expand outside the game play matrix display area to display additional symbols or sub-symbols on additional reels (e.g., up to twelve reels). For example, during a spin of a game (e.g., a base game or a bonus game), the controller may randomly determine that a first column in the adjustable game play matrix should display ten symbols, and the EGM screen may display the first column of the adjustable game play matrix expanded outside of game play matrix display area to display ten symbols on ten respective reels. In some embodiments, the expansion of a column of the adjustable game play matrix outside of game play matrix display area may be triggered by an event (e.g., by specific symbols or sub-symbols included in the displayed symbols of the base game or the bonus game). In some embodiments, the expansion of a column of the adjustable game play matrix outside of the game play matrix display area may be randomly determined by the controller (e.g., not linked to an event). In some embodiments, once one or more columns of the adjustable game play matrix is expanded outside the game play matrix display area, any of the reels may be randomly split into multiple sub-reels (with corresponding sub-symbols), as described herein.

Currently, certain challenges arise when positioning information on a display (e.g., screen) of an EGM (e.g., or other gaming device such as a smart phone or other end user device). Display space is limited and sought-after. Thus, it is beneficial to organize displayed information in order to maximize the amount of information that may be displayed on an EGM screen. For example, some electronic games include game play matrices with columns that vertically expand and take up additional display space when displaying additional symbols during play. As the columns vertically expand, there is less space available to display information. Thus, improvements in the way in which game play matrix columns are displayed are desired. These challenges are also amplified when mobile games are provided (e.g., at an end user device, such as a smart phone with limited screen size, associated with a player).

Additionally, there are currently limited ways for players of electronic games to access specific features (e.g., a grand jackpot) and upgrades within electronic games. For example, some electronic games only allow access to a specific feature via a specific triggering event, and do not provide multiple ways to access features and/or upgrades. Thus, improvements in the way in which features and upgrades are accessed in electronic games are desired.

The systems and methods described herein facilitate compact and clear display of game play matrices on an EGM screen (e.g., or end user device), and facilitate additional information to be displayed on the EGM screen without compromising game play. For example, the EGM screens described herein include a display area of a generally fixed height for displaying an adjustable game play matrix that is generally arranged in columns. Each column of the adjustable game play matrix may display, for example, between three and six symbols during each instance of the electronic game, and each column may display the same number of symbols as the other columns or a different number of symbols from the other columns. The display area includes a generally fixed height (e.g., a vertical dimension with respect to the EGM screen) in which the adjustable game play matrix is displayed, and larger or smaller versions of the symbols to be displayed are selected to be displayed based on the number of symbols to be displayed on each column (e.g., such that the displayed symbols are contained within and are distributed over (e.g., fill) the display area of generally fixed height).

For example, during one instance (e.g., of a base game or a bonus game), a first column of the adjustable game play matrix may display three symbols that are each displayed over approximately one third of the height of the first column (e.g., height of the display area). In the next instance, the first column may display six symbols, where each symbol is displayed over approximately one sixth of the height of the first column (e.g., height of the display area). Thus, as the number of symbols to be displayed on each column of the adjustable game play matrix changes, larger or smaller versions of the symbols to be displayed are selected to be displayed so that the displayed symbols are generally displayed in an area of fixed vertical height.

Additionally, when specific features are triggered, one or more columns of the adjustable game play matrix may expand such that the one or more columns are no longer contained within the game play matrix display area (e.g., due to displaying more than a threshold number of symbols). During such features, the height of the expanded columns may temporarily exceed the height of the nominal (e.g., unexpanded) columns, while the remaining columns remain displayed over the fixed height. Accordingly, the compactness and clear display of the game play matrices can be maintained while still allowing access to specific features that may require one or more columns of the adjustable game play matrix to expand outside the nominal display area.

The systems and methods described herein also facilitate access to specific features via multiple triggering events, and also provide additional upgrades for specific symbols within an electronic game. For example, the systems and methods described herein allow access to a specific feature (e.g., a grand jackpot) via multiple triggering events, and also provide new methods of upgrading output amounts associated with COR symbols during play of a bonus game.

The systems and methods described herein also facilitate access to expanded game play matrices via splitting reels within the game play matrices. For example, during an instance of an electronic game (e.g., a base game or a bonus game), a controller may randomly determine that one or more reels within the adjustable game play matrix should be split to display multiple sub-reels, and the multiple sub-reels may be displayed within the corresponding reel. Accordingly, the adjustable game play matrix may be expanded to display the multiple sub-reels in place of the corresponding reel, which may allow players additional opportunities to access specific features (e.g., a bonus game) during game play.

The description provided herein includes certain examples and exemplary use cases. It should be understood that these examples and use cases are included herein for illustrative purposes, and these examples and use cases should not be taken to limit the present disclosure. The systems and methods described herein may be used in many other use cases.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
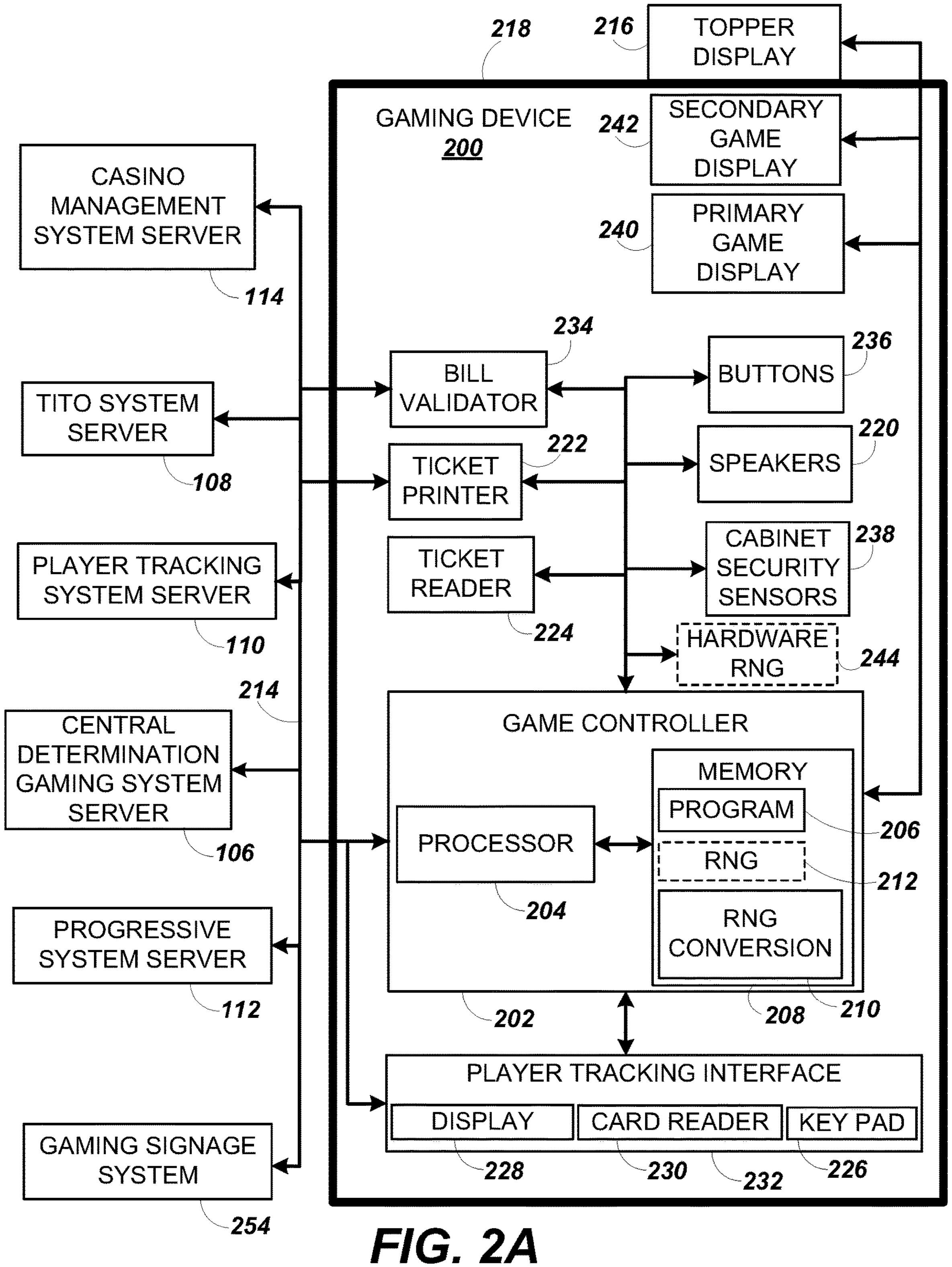
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
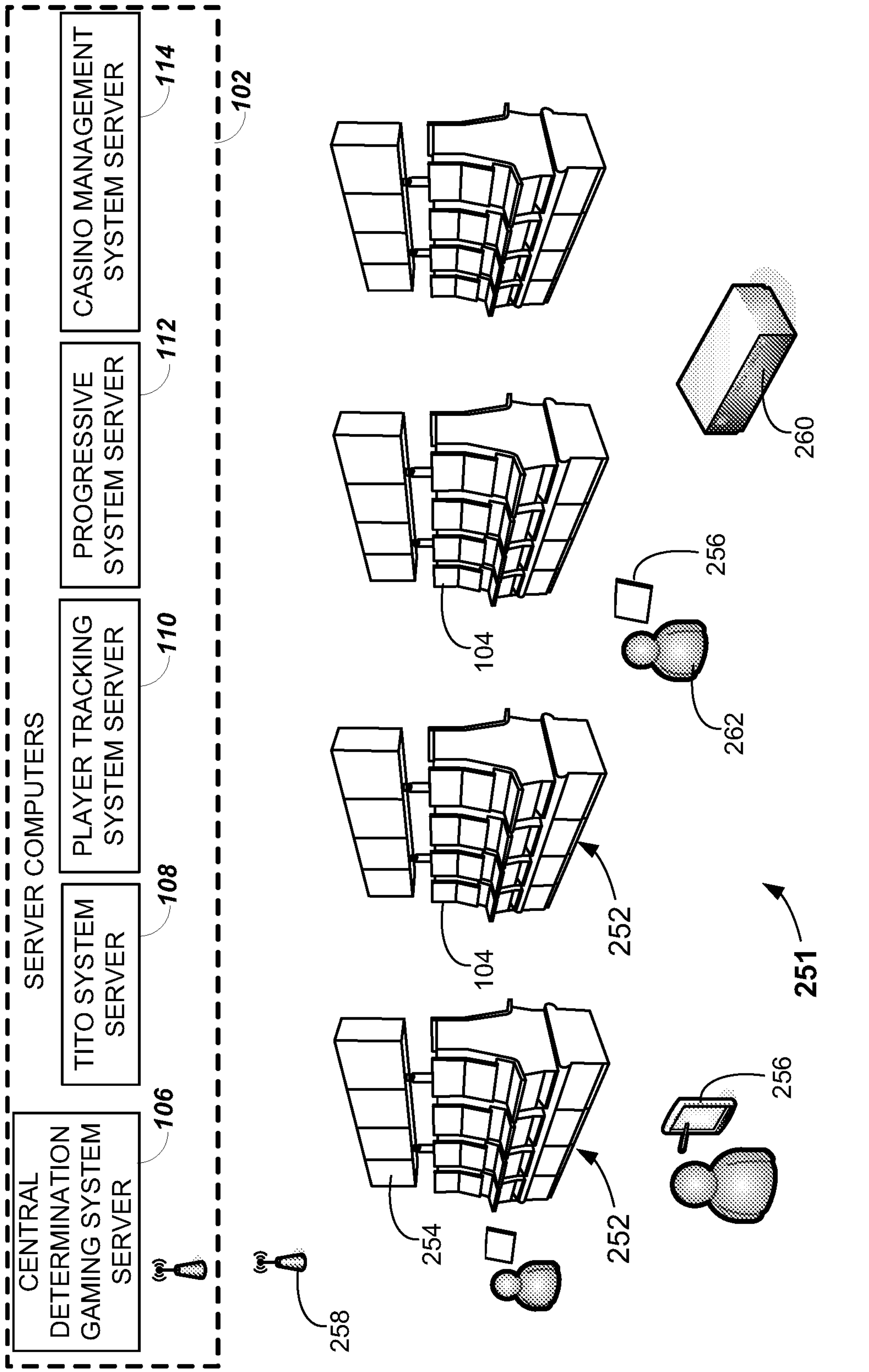
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
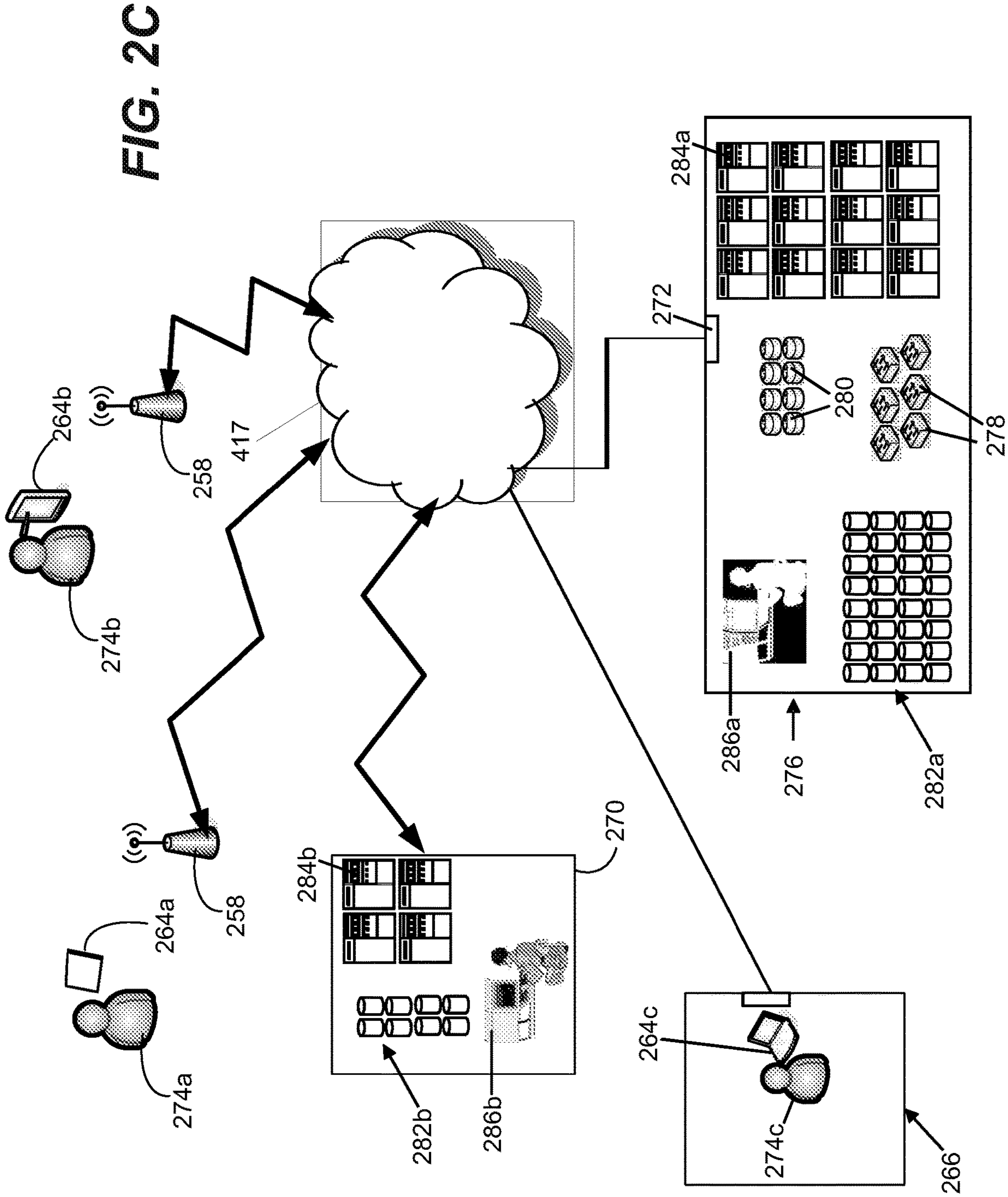
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
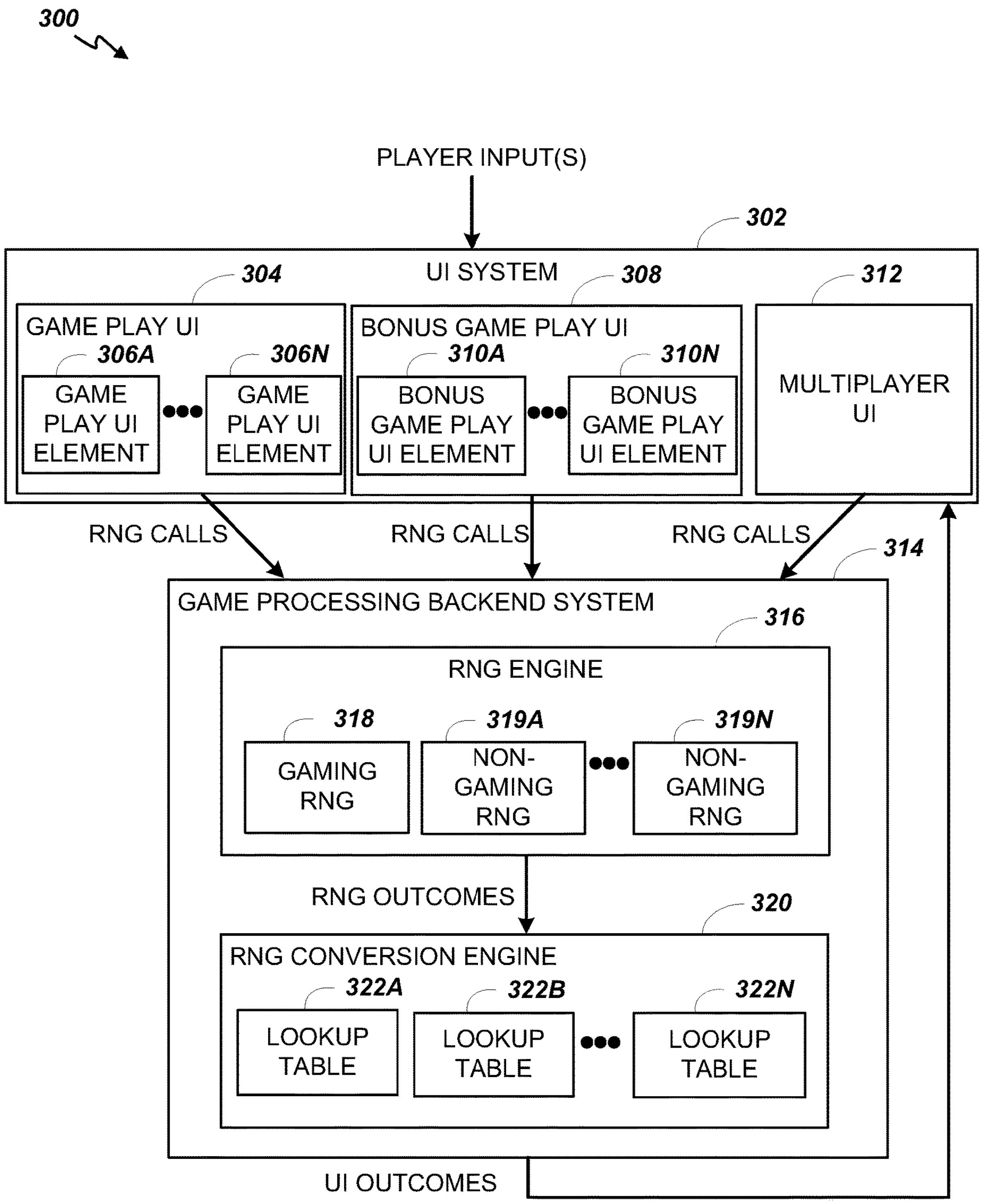
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIG. 4 illustrates an example EGM screen 400 of an electronic game (e.g., a base game), which may be displayed on a display screen of an electronic gaming device or EGM (e.g., EGM 104) and may be controlled via, for example, a controller (e.g., game controller 202) that includes at least one processor in communication with at least one memory. While the illustrated embodiments generally show an EGM screen, similar screenshots and/or interfaces are also envisioned as being provided on other types of electronic gaming devices (e.g., with screens of further limited size such as mobile devices, personal computers, tablets, etc.). Accordingly, references to an EGM screen of an EGM in this description should only be viewed as an example of a screen of an electronic gaming device.

As shown in FIG. 4, EGM screen 400 includes a game play matrix display area 402 that displays an adjustable game play matrix 403. Adjustable game play matrix 403 includes a plurality of columns 408 that each include reels 407 (e.g., rows) that are adjustable display positions for displaying symbols 404 of various size.

In some embodiments, the number of symbols 404 displayed on each column 408 of adjustable game play matrix 403 is between 1 and n, where n is a real number, and each column 408 may display a different number of symbols 404. In the illustrated embodiment, the first (e.g., left-most) column 408 includes or displays four reels 407 with one symbol 404 corresponding to each reel 407.

In some embodiments, the displayed symbols 404 may include at least one cash on reel (COR) symbol that is associated with a respective output amount. For example, in the second reel 407 (e.g., row) of first (e.g., left-most) column 408, a COR symbol is displayed that has an associated output amount of 1000 (e.g., 1000 credits).

In the illustrated embodiment, adjustable game play matrix 403 includes a plurality of reels 407 arranged in five columns 408. However, adjustable game play matrix 403 may have any suitable configuration and may include any suitable number of reels 407 that enable the corresponding electronic game to function as described herein.

Game play matrix display area 402 includes height 406 (e.g., vertical dimension with respect to FIG. 4) that is generally constant across game play matrix display area 402. That is, each column 408 of adjustable game play matrix 403 is generally displayed on game play matrix display area 402 with generally constant height 406 during play of the electronic game (e.g., a base game or a bonus game).

While the embodiments described herein refer to columns 408 of adjustable game play matrix 403, similar embodiments would also be applicable to rows of adjustable game play matrix 403. For example, the number of symbols 404 and the symbols 404 displayed in each row of adjustable game play matrix 403 may be determined and displayed using similar methods described herein with respect to columns 408 of adjustable game play matrix 403. For such embodiments, the width of each row and each reel 407 would be adjusted during game play using similar methods in which the height (e.g., height 406) of columns 408 and height of reels 407 are adjusted during game play, as described herein.

Example Embodiment of Dynamic Symbol Display

In the example embodiment, each reel 407 may be a position within adjustable game play matrix 403 and each reel 407 may be an adjustable display position for displaying symbols 404 of various size. In the embodiment illustrated in FIG. 4, adjustable game play matrix 403 includes a first (e.g., left-most) column 408 that includes a first predefined number of reels 407 (e.g., six). However, in the illustrated embodiment, only four of the six predefined number of reels 407 are prominently displayed on first column 408. The first predefined number of reels 407 is generally constant for a column 408 throughout the electronic game, with the number of symbols displayed in column 408 during the electronic game being equal to or less than the first predefined number of reels 407.

During an instance of the electronic game, a first number of symbols 404 (e.g., four symbols) to display on first column 408 is randomly determined. The first number of symbols (e.g., four) is different from the first predefined number of reels (e.g., six). To compensate for this difference, the controller (e.g., game controller 202) adjusts display of column 408, as further described below.

Once the first number of symbols is determined, a first plurality of symbols 404 corresponding to the first number of symbols is randomly determined. That is, a first plurality of symbols 404 is determined, where the first plurality of symbols 404 includes a number of symbols corresponding to the first number. For example, if the first number of symbols is four, then the first plurality of symbols 404 includes four symbols 404. Additionally, each symbol 404 of the first plurality of symbols 404 may be independently determined. For example, a symbol 404 corresponding to one reel 407 on first column 408 may be determined independently of all other symbols 404 on adjustable game play matrix 403. That is, each reel 407 spins independently of the other reels 407. In some embodiments, reels 407 may be connected such that at least some symbols 404 displayed on adjustable game play matrix 403 are determined dependently on other displayed symbols 404.

A first size, of a plurality of sizes, is selected for each symbol 404 of the first plurality of symbols to generate a sized first plurality of symbols. The first size corresponds to the first number of symbols. For example, if the first plurality of symbols 404 to be displayed in first column 408 includes four symbols 404, then each symbol 404 to be displayed will be sized to fill approximately one-fourth of the height (e.g., height 406) of first column 408. In contrast, if the first plurality of symbols 404 to be displayed in first column 408 includes six symbols, then each symbol 404 to be displayed will be sized to fill approximately one-sixth of the height of first column 408. Accordingly, the symbols 404 to be displayed in each respective column 408 are sized according to the number of symbols 404 to be displayed in each respective column 408.

In some embodiments, there are four sizes of symbols 404 and reels 407 corresponding to displaying three symbols 404, four symbols 404, five symbols 404, and six symbols 404. In some embodiments, additional or fewer sizes may exist depending on the height or width of columns 408 and/or the number of symbols 404 to display. In some embodiments, each size of symbols 404 includes symbols 404 of a different symbol height. In some embodiments, each size of reels 407 includes reels 407 of a different reel height.

In some embodiments, the controller may have access to one or more lookup tables stored in one or more databases, and the controller may access the one or more lookup tables when resizing symbols 404. For example, the database may include a lookup table that includes a full set of symbols (e.g., A for "Ace", K for "King", Q for "Queen", etc.) that are sized for displaying in a column 408 that displays three symbols 404. For example, the symbols 404 displayed in third or middle column 408 of adjustable game play matrix 403 may have been resized using the lookup table corresponding to symbols that are sized for displaying in a column 408 that displays three symbols 404. The database may also include lookup tables having full sets of symbols that are sized for displaying in a column 408 that displays four, five, six, or more symbols 404. For instance, a first lookup table may store symbols associated with a height of ⅓ of a column 408, a second lookup table may store symbols associated with a height of ¼ of a column 408, a third lookup table may store symbols associated with a height of ⅕ of a column 408, and a fourth lookup table may store symbols associated with a height of ⅙ of a column 408.

In some embodiments, the database includes lookup tables that includes different sizes of the same symbol (e.g., one of the lookup tables may include different sizes of the "Ace" symbol). When resizing symbols 404, the controller may access the database of lookup tables and select the appropriate size of each symbol 404 to display based on the number of symbols to be displayed in the corresponding column 408. For example, when resizing the "Ace" symbol 404 at the top of first column 408, the controller may have searched a lookup table including different sizes of "Ace" symbols for an "Ace" symbol to display in a column that displays four symbols 404, and selected that size of "Ace" symbol for display in first column 408. For instance, a lookup table may store all available sizes of the "Ace" symbol (e.g., ⅓ of a column 408, ¼ of a column 408, etc.) and, upon a determination to display an "Ace" symbol, that lookup table may be selected and a lookup performed therein to select the appropriately sized "Ace" symbol.

The display of the reels 407 on first column 408 is adjusted by adjusting a height of a first number of the first predefined number of reels 407 to receive the sized first plurality of symbols. In the example embodiment, each column 408 of adjustable game play matrix 403 always includes six reels 407. However, if fewer than six symbols 404 are to be displayed in each column 408, then not all of the six reels 407 will be used to display symbols, and some of the six nominal reels 407 will be shrunk to have no height (e.g., a size of zero or approximately zero).

For example, if only four symbols 404 are displayed on a column 408, then two of the six nominal reels 407 are shrunk to zero height, and the remaining four reels 407 are adjusted so that they are distributed over approximately one-fourth of the height 406 of the column 408, which corresponds to the height of the corresponding sized symbols. In the example embodiment, the adjustment of the height of each displayed reel 407 occurs instantaneously, such that the player is immediately presented with the number of reels 407 that are displayed and spinning for that instance of the electronic game (e.g., the player does not see the resizing of reels 407). For example, if four symbols are to be displayed on first column 408, then first column 408 displays four spinning reels 407 (e.g., resized reels 407) during the instance of the electronic game. In some embodiments, reels 407 that display symbols of the corresponding size may be selected for display on first column 408 before the spinning animation is displayed (e.g., reels 407 selected for display in first column 408 may include symbols having a first size that corresponds to the number of symbols to display in first column 408).

In some embodiments, one or more displayed symbols 404 may be a different size than the other displayed symbols 404. For example, if the first plurality of symbols 404 to be displayed in first column 408 includes four symbols 404, then two symbols 404 to be displayed may be sized to fill approximately one-sixth of the height (e.g., height 406) of first column 408 and two symbols 404 to be displayed may be sized to fill approximately one-third of the height (e.g., height 406) of first column 408. Accordingly, symbols 404 of different sizes and/or heights may be displayed within the same column 408 of adjustable game play matrix 403.

In some embodiments, when the number of symbols to display in a column 408 is less than the number of nominal reels 407, the nominal reels 407 that are not displayed on adjustable game play matrix 403 are skipped and not spun. In some embodiments, each nominal reel 407 is always spun, but only the symbols corresponding to displayed nominal reels 407 are displayed on adjustable game play matrix 403 (e.g., the symbols corresponding to the nominal reels 407 that are not displayed are not displayed). For example, in first column 408 of FIG. 4, first, second, third, and fourth (e.g., the top four) nominal reels 407 are displayed and spun during the instance of the electronic game, while fifth and sixth nominal reels 407 are skipped/not displayed (e.g., shrunk to zero size).

The resized reels 407 are spun during an instance of the electronic game, and each symbol 404 that appears one the resized spinning reels 407 is sized according to the number of symbols 404 to be displayed in that column 408. In the example embodiment, a sized symbol 404 to display at each reel 407 at the end of the instance of the electronic game is randomly determined before the animations of the spinning resized reels 407 are displayed to a player. At the end of the display of the spinning resized reels 407, the corresponding symbols 404 that were previously determined are displayed at the corresponding resized reels 407. For example, with reference to FIG. 4, it may be randomly determined that first reel 407 in first column 408 (e.g., the top-left-most reel 407) should display an "Ace" symbol before the animation of the spinning resized reels is shown to the player. Once the animation of the spinning resized reels 407 is complete, the first reel 407 in first column 408 displays the "Ace" symbol.

Once the first plurality of symbols 404 is sized, the controller (e.g., game controller 2002) causes display of the sized first plurality of symbols at the first number of the first predefined number of reels 407 (e.g., following the animations of the spinning resized reels). For example, if there are four symbols 404 in the first plurality of symbols 404, then reels 407 on first column 408 are resized such that two of the reels 407 are shrunk to have a height of zero (e.g., no size) and the remaining four reels 407 are resized to be displayed over approximately one-fourth of height 406 of first column 408. Then, the four symbols 404 of the first plurality of symbols are displayed at the four reels 407 of first column 408 that each have a height of approximately one-fourth of height 406 of first column 408. The sized symbols 404 that are displayed correspond to the size of the resized reels 407 that receive the displayed symbols 404.

Second Embodiment of Dynamic Symbol Display

In some embodiments, adjustable game play matrix 403 that is displayed to a player may be based at least in part on a subset of a backend matrix. For example, in some embodiments, adjustable game play matrix 403 of the electronic game generally includes five columns 408, and each column 408 displays between three and six symbols 404. Adjustable game play matrix 403 displayed during the electronic game may be based on a backend game play matrix of a generally constant size (e.g., the number of rows and columns in the backend game play matrix is constant). During an instance of the electronic game, all or a subset of the backend game play matrix may be displayed to the player on adjustable game play matrix 403. The backend game play matrix generally includes five columns 408 that each include six reels 407 (e.g., rows). A symbol corresponding to each reel 407 may be independently determined during each instance of the electronic game.

When determining symbols 404 to display on reels 407 of adjustable game play matrix 403 for each instance of the electronic game, a predefined number of symbols (e.g., six symbols) are randomly and independently determined (e.g., each symbol is determined independently of the other symbols) for each column of the backend game play matrix. That is, a symbol is independently and randomly determined for each reel in the backend game play matrix. Then, a subset of the predetermined number of symbols (which may include all of the predetermined number of symbols) for each column of the backend game play matrix is randomly selected for display in respective column 408 of adjustable game play matrix 403 in a randomly determined order. That is, for each instance of the electronic game and for each column of the backend game play matrix, a predetermined number of symbols are randomly determined (e.g., six symbols are each randomly determined for each column of the backend game play matrix), and each symbol is randomly determined independently of the other symbols. Then, for each separate column of the backend game play matrix, a randomly determined number of the symbols determined for that specific column of the backend game play matrix are selected for display on corresponding column 408 of adjustable game play matrix 403 in a randomly determined order.

For example, for a first column of the backend game play matrix, six symbols may be randomly and independently determined for six corresponding reels, and adjustable game play matrix 403 may include six nominal reels 407 (e.g., corresponding to the number of reels in the first column of the backend game play matrix). Then, it may be randomly determined that only three of the six symbols of the first column of the backend game play matrix should be displayed on first column 408 of adjustable game play matrix 403 in a randomly determined order. Because there are only three symbols to be displayed, larger versions of the three symbols are displayed on adjustable game play matrix 403, and the size of the reels 407 at which the three symbols are displayed are adjusted such that reels 407 at which displayed symbols 404 are received are larger and such that the larger displayed symbols 404 are displayed across multiple nominal reels 407 on first column 408 of adjustable game play matrix 403 in the randomly determined order.

For example, first symbol 404 displayed on first column 408 may be displayed across first and second nominal reels 407, second symbol 404 displayed on first column 408 may be displayed across third and fourth nominal reels 407, and third symbol 404 displayed on first column 408 may be displayed across fifth and sixth nominal reels 407. The other three symbols determined for the first column of the backend game play matrix that are determined not to be displayed on adjustable game play matrix 403 are not displayed. A similar determination and display process for remaining columns 408 in adjustable game play matrix 403 is performed independently of the process performed for first column 408, with the exception that generally the same predetermined number of symbols (e.g., six symbols) are initially randomly determined for all columns of the backend game play matrix.

In some embodiments, adjustable game play matrix 403 may be based on a backend game play matrix that generally includes the same number of columns as adjustable game play matrix 403, and each column of the backend game play matrix may generally include the same number of reels (e.g., each column of the backend game play matrix includes six reels). Each reel of the backend game play matrix may be its own spinning reel at which a corresponding symbol is randomly and independently determined during each instance of the electronic game.

In some embodiments, during an instance of the electronic game, the controller may first determine a number of reels 407 to display in each column 408 of adjustable game play matrix 403, and reels 407 may be sized such that reels 407 (e.g., independent reels) are distributed over height 406 of game play matrix display area 402. Then, the controller may randomly determine a symbol 404 to display at each reel 407, and each symbol 404 may be determined independently of other symbols 404. Once symbols 404 are determined, symbols 404 are resized to correspond to corresponding reel 407 (e.g., symbols 404 may be scaled and/or different sizes of symbols 404 may be selected for display), and then symbols 404 are displayed at corresponding reels 407.

In some embodiments, one or more displayed symbols 404 and/or reels 407 may be a different size than the other displayed symbols 404 and/or reels 407. For example, if the symbols 404 and/or reels 407 to be displayed in first column 408 includes four symbols 404 to be displayed at four corresponding reels 407, then two symbols 404 (and two corresponding reels 407) to be displayed may be sized to fill approximately one-sixth of the height (e.g., height 406) of first column 408 and two symbols 404 (and two corresponding reels 407) to be displayed may be sized to fill approximately one-third of the height (e.g., height 406) of first column 408. Accordingly, symbols 404 and/or reels 407 of different sizes and/or heights may be displayed within the same column 408 of adjustable game play matrix 403.

In some embodiments, when determining symbols 404 to display in adjustable game play matrix 403, a predefined number of symbols (e.g., 6) are each independently and randomly determined for each respective column of the backend game play matrix (e.g., using RNG 212 and RNG conversion engine 210, 320). Stated another way, one or more pluralities of symbols each corresponding to one or more columns of the backend game play matrix, respectively, are randomly determined, where each plurality of symbols includes the same number of symbols. Accordingly, one symbol is randomly determined for each reel within backend game play matrix. Further, during an instance of the electronic game, each reel of backend game play matrix may be its own reel such that a symbol corresponding to each reel is randomly determined independently of symbols corresponding to other reels.

In the embodiment illustrated in FIG. 4, a predefined number of symbols (e.g., six) are randomly determined for each column of a backend game play matrix, and then a subset of the predefined number of symbols determined for each column of the backend game play matrix is randomly determined to be displayed on a corresponding column 408 of adjustable game play matrix 403 (e.g., at reels 407).

For example, in the illustrated embodiment, six symbols may be independently and randomly determined for each column of the backend game play matrix (e.g., five pluralities of symbols each including six symbols are determined—one plurality of symbols per column of the backend game play matrix). That is, thirty individual symbols are randomly determined for the backend game play matrix (e.g., six symbols per column), and each individual symbol may be randomly determined independently of the other randomly determined symbols. Then, a respective subset (or number) of each plurality of symbols randomly determined for each respective column is randomly selected to be displayed on a corresponding column 408 of adjustable game play matrix 403 (e.g., via game controller 202 and/or using RNG 212 and RNG conversion engine 210, 320). Then, the subset of each plurality of symbols is displayed on corresponding column 408 of adjustable game play matrix 403, where each symbol 404 of each subset is displayed in a respective reel 407.

For example, in a first (e.g., left) column 408 of five-column adjustable game play matrix 403 illustrated in FIG. 4, four of the six symbols randomly determined for the first column of the backend game play matrix were randomly determined to be displayed on first column 408 of adjustable game play matrix 403 in the displayed order. That is, while first (e.g., left) column 408 of five-column backend game play matrix includes six reels, first column 408 of adjustable game play matrix 403 only displays four symbols 404 within four respective reels 407 (e.g., where each displayed reel 407 spans more than one nominal reel 407 that would be shown if six symbols 404 were displayed) following an instance of the electronic game.

In first column 408 of adjustable game play matrix 403 illustrated in FIG. 4, because only four symbols 404 are displayed (e.g., as compared to the maximum number (e.g., six) of symbols that may be displayed in each column 408), larger versions of the four symbols 404 are selected for display (e.g., by game controller 202), and corresponding reel 407 of each displayed symbol 404 is adjusted so that the four symbols 404 may be displayed on first column 408 within game play matrix display area 402 of generally fixed height 406 (e.g., such that displayed symbols 404 fill up game play matrix display area 402 within first column 408). That is, for each column 408 of adjustable game play matrix 403, corresponding symbols are displayed in game play matrix display area 402 such that corresponding symbols 404 are distributed over height 406 of game play matrix display area 402.

When adjusting the display of reels 407 and symbols 404, each displayed symbol 404 may be displayed larger since two of the six randomly determined symbols for first column of the backend game play matrix are not displayed on adjustable game play matrix 403 illustrated in FIG. 4. Other columns 408 of adjustable game play matrix 403 may display the same number of symbols 404 as first column 408, or a different number of symbols 404. For example, as shown in FIG. 4, there are six symbols 404 displayed on second column 408 (e.g., second column from the left) within adjustable game play matrix 403. That is, first and second columns 408 have same height 406, and each display different numbers of symbols 404.

The number of symbols 404, the selection of symbols 404, and/or the order of symbols 404 to be displayed on each respective column 408 of adjustable game play matrix 403 may be randomly determined based on symbols determined for corresponding columns of the backend game play matrix. For example, six symbols may be randomly determined for a first column of backend game play matrix. Then, the controller may randomly determine that (i) four of the six randomly determined symbols should be displayed and (ii) the symbols corresponding to the first, second, fifth, and six reels (e.g., rows) of backend game play matrix should be displayed. In some embodiments, the controller may also randomly determine an order in which to display the symbols. EGM screen 400 then displays the symbols from the first, second, fifth, and sixth reels of the first column of the backend game play matrix in adjustable game play matrix 403 in the randomly determined order on first column 408 (e.g., and the symbols 404 may be distributed across height 406).

In some embodiments, the one or more pluralities of symbols determined for respective one or more columns of the backend game play matrix may include one plurality of symbols corresponding to one column of the backend game play matrix. The one plurality of symbols may include six symbols, and the subset of the one plurality of symbols may include three symbols 404 to display on adjustable game play matrix 403. In such embodiments, backend game play matrix may include one column that includes six reels, and a controller (e.g., game controller 202) may randomly determine a symbol for each of the six reels. Then, the controller may randomly determine that three of the six randomly determined symbols should be displayed on corresponding column 408 of adjustable game play matrix 403 in a randomly determined order. Then, EGM screen 400 may display the three symbols 404 on first column 408 of adjustable game play matrix 403 in the randomly determined order, where each symbol 404 is displayed over approximately one-third of height 406 of column 408 (e.g., similar to the middle column 408 of adjustable game play matrix 403 illustrated in FIG. 4).

In some embodiments, adjustable game play matrix 403 may include multiple columns 408. For example, the one or more pluralities of symbols of the backend game play matrix may include a first plurality of symbols and a second plurality of symbols corresponding to a first column and a second column of the backend game play matrix, respectively. The first plurality of symbols and the second plurality of symbols may each include six symbols, and the subset of the first plurality of symbols to be displayed on first column 408 of adjustable game play matrix 403 and the subset of the second plurality of symbols to be displayed on second column 408 of adjustable game play matrix 403 may include five symbols and three symbols, respectively. The five symbols 404 of the subset of the first plurality of symbols and the three symbols 404 of the subset of the second plurality of symbols may be displayed on EGM screen 400 in first and second columns 408 of adjustable game play matrix 403, respectively. Each subset of symbols 404 may be displayed in a randomly determined order on respective column 408 of adjustable game play matrix 403.

In some embodiments, symbols 404 of the first subset of symbols 404 and symbols 404 of the second subset of symbols 404 may be displayed on first column 408 and second column 408 of adjustable game play matrix 403, respectively, such that height 406 of first column 408 and second column 408 of adjustable game play matrix 403 are about the same. In some embodiments, the subset of the first plurality of symbols and the subset of the second plurality of symbols are each displayed on first column 408 and second column 408 of adjustable game play matrix 403, respectively, such that the five symbols 404 displayed on first column 408 of adjustable game play matrix 403 are smaller than the three symbols 404 displayed on second column 408 of adjustable game play matrix 403. That is, the size of the displayed symbols 404 on each column 408 may be adjusted based on the number of symbols 404 included in the respective subset of symbols 404 to be displayed on each column 408 of adjustable game play matrix 403 such that the displayed symbols 404 are distributed over height 406 of game play matrix display area 402.

Third Embodiment of Dynamic Symbol Display

In some embodiments, a set of reels (e.g., three to six reels) displayed in each column 408 of adjustable game play matrix 403 may be selected from a plurality of reel sets, where each reel in each reel set may have a corresponding symbol that is randomly and independently determined. For example, for a first column 408 of adjustable game play matrix 403, reel sets including three reels, four reels, five reels, and six reels may be randomly determined. Then, one of the randomly determined reel sets may be randomly determined to be displayed on first column 408 (e.g., by a controller). For example, the reel set that includes four reels 407 may be randomly determined to be displayed on first column 408, and EGM screen 400 displays four reels 407 in first column 408 of adjustable game play matrix 403. Then, EGM screen 400 may display (i) each of the four reels 407 (of the displayed reel set) spinning during an instance of the electronic game, and (ii) a corresponding symbol 404 at each reel 407 at the end of the instance of the electronic game. Each symbol 404 to display at each reel 407 may be randomly determined independently of the other displayed symbols 404.

Stated another way, a plurality of reel sets may be "stacked" on top of each other on first column 408 of adjustable game play matrix 403, and the plurality of reel sets are initially not displayed (e.g., are hidden to the player). Then, one of the hidden reel sets is randomly selected for display on first column 408. Next, the selected reel set is displayed on first column 408, and a symbol 404 corresponding to each reel 407 of the selected reel set is randomly and independently determined for display. An animation is displayed that shows the reels 407 of the selected reel set spinning, and the final symbol 404 displayed at each reel 407 of the selected reel set corresponds to the symbol 404 that was randomly and independently determined to be displayed. The symbol 404 to display on each reel 407 of the selected reel set may be determined before the spinning animation is displayed.

Fourth Embodiment of Dynamic Symbol Display

In some embodiments, the set of reels 407 displayed in each column 408 of adjustable game play matrix may be based on spawned sets of reels corresponding to each column 408 of adjustable game play matrix 403. For example, it may be randomly determined (e.g., by game controller 202) that four reels 407 should be displayed in first column 408 of adjustable game play matrix 403. Then, four reels 407 are displayed in first column 408 of adjustable game play matrix (e.g., a new set of reels is spawned or generated by game controller 202 for each column 408 during each instance of the electronic game, and there is no resizing of the reels 407). Then, an animation is displayed that shows the four reels 407 spinning, with a symbol 404 displayed on each reel 407 at the end of the instance of the electronic game. The symbol 404 to display on each reel 407 may be determined before the spinning animation is displayed, and the symbol 404 to display on each reel 407 may be randomly determined independently of the other symbols 404 to be displayed. In some embodiments, the controller has access to templates (e.g., stored in a memory) corresponding to possible reel 407 configurations (e.g., three reels 407 in a column 408, four reels 407 in a column 408, five reels 407 in a column 408, six reels 407 in a column 408, etc.), and selects the appropriate template of reels 407 to display in a column 408 of adjustable game play matrix 403.

Aspects Applicable to All Embodiments

In some embodiments, each reel 407 within a column 408 of adjustable game play matrix 403 may be connected to other reels 407 in that column 408 such that each column 408 is displayed as a continuous reel 407 during an instance of the electronic game. In some embodiments, symbols 404 to be displayed at reels 407 within a column 408 may be determined dependently of other reels 407 within the same column 408 or within other columns 408. For example, if all reels 407 within a column 408 spin as a single, connected reel, then symbols 404 displayed on each reel 407 of that column 408 may be dependent on symbols 404 displayed on other reels 407 of that column 408.

In the embodiment illustrated in FIG. 4, adjustable game play matrix 403 that is displayed on EGM screen 400 includes five columns 408. Each column 408 includes up to six reels 407, and each column 408 displays between three and six symbols 404 (e.g., the number of symbols 404 displayed on each column 408 may be different from the maximum number of reels 407 in each column 408). Each column 408 generally has the same height 406. In some embodiments, each column 408 may display any suitable number of symbols (e.g., between one and six symbols 404) and/or may include any suitable number of reels 407 that enable functionality of the electronic game. While an example embodiment is described herein with respect to an EGM (e.g., EGM screen 400), it should be appreciated that online and mobile embodiments are envisioned (e.g., where the embodiments described herein are provided at an end user device (e.g., EUDs 264*a-c*)).

In some embodiments, height 406 of game play matrix display area 402 (or of adjustable game play matrix 403) may vary during play of the electronic game (e.g., a base game or a bonus game). For example, columns 408 may expand to accommodate display of symbols 404 that are in excess of the maximum number (e.g., six) of symbols 404 allowed to be displayed within generally fixed height 406 of each column 408, as further described herein (e.g., due to triggering of a feature). In such embodiments, game play matrix display area 402 generally includes a fixed height 406 for each column 408 except for columns 408 in which more than the maximum number of symbols 404 allowed to be displayed with generally fixed height 406 are displayed. Accordingly, game play matrix display area 402 may accommodate larger numbers of symbols 404 within specific columns 408, while still maintaining compactness when displaying columns 408 having less than or equal to the maximum number of symbols 404 allowed to be displayed within generally fixed height 406 of adjustable game play matrix 403 and game play matrix display area 402. In some embodiments, adjustable game play matrix 403 accommodates twelve reels 407 and/or symbols 404 in one or more columns 408.

For example, during an instance of an electronic game (e.g., a base game or a bonus game), a controller (e.g., game controller 202) may randomly determine that a first column 408 in an adjustable game play matrix 403 should display ten symbols, and EGM screen 400 may display first column 408 expanded outside of the nominal game play matrix display area 402 to display ten symbols in ten reels 407. In some embodiments, the expansion of a column 408 of adjustable game play matrix 403 outside of game play matrix display area 402 may be triggered by an event (e.g., by specific symbols 404 or sub-symbols 702 included in the displayed symbols 404 of the base game or the bonus game). In some embodiments, the expansion of a column 408 of adjustable game play matrix 403 outside of game play matrix display area 402 may be randomly determined by the controller (e.g., not linked to an event). In some embodiments, once one or more columns 408 of adjustable game play matrix 403 are expanded outside game play matrix display area 402, any of the displayed symbols 404 and/or reels 407 may be randomly determined to be split into multiple sub-reels (e.g., that display corresponding sub-symbols 702), as further described herein.

In some embodiments, during an instance of game play of an electronic game (e.g., during a spin/play), displayed symbols 404 are randomly determined for the electronic game (e.g., via a controller 202 and/or using RNG 212 and RNG conversion engine 210, 320), and the displayed symbols 404 may include symbols 404 arranged in reels 407 (e.g., rows) within one or more columns 408 of adjustable game play matrix 403.

In some embodiments, adjustable game play matrix 403 may include multiple columns 408, and any of and/or a combination of the above processes may be carried out for each column 408 of adjustable game play matrix 403. During each instance of the electronic game, each column 408 may display a different number of symbols 404.

In some embodiments, the electronic game may include multiple instances or turns, and any of and/or a combination of the above processes may be carried out for each column 408 of adjustable game play matrix 403 during each instance of the electronic game.

The displayed symbols 404 (e.g., symbols displayed within adjustable game play matrix 403) may be used to determine if an award should be presented to the player, an amount of an award to present to the player, and/or if a bonus game should be initiated. The number of symbols 404 displayed in each column 408 may affect the number of possible paylines or ways for a player to win an award or feature. For example, as the number of symbols 404 displayed in each column 408 increases, the number of possible paylines or ways to win also increases.

In some embodiments, a player may be presented with an award when the same symbol (e.g., a non-COR symbol) is included in symbols 404 displayed on at least first column 408 (e.g., first column from the left), second column 408 (e.g., second column from the left), and third column 408 (e.g., third column from the left). The same symbols may be displayed in any reel 407 (e.g., row) of first, second, and third columns 408 in order for an award to be presented to the player. Such an award may be presented in addition to awards based on COR symbols (e.g., COR symbols associated with output amounts of "1000" in FIG. 4, COR symbols 514, 614, 618) included in displayed symbols 404.

Stated another way, an award may be presented to a player if the same symbol is displayed on at least three consecutive columns 408 (e.g., from left to right), starting with first or left-most column 408. For example, if an "Ace" symbol is displayed on at least first column 408 (e.g., in the second row), second column 408 (e.g., in the first row), and third column 408 (e.g., in the third row), then the player may be presented with an award. In some embodiments, the player may be presented with an award if the same symbol is displayed on additional consecutive columns 408 (e.g., fourth column 408 and optionally fifth column 408) in any position (e.g., row), in addition to being displayed on first column 408, second column 408, and third column 408. In some embodiments, the amount of the award presented to the player may be based on the number of consecutive columns 408 (e.g., from left to right) that, starting with first or left-most column 408, display the same symbol. For example, if first, second, third, and fourth columns 408 display the same symbol, then a larger award may be presented to the player than if only first, second, and third columns 408 display the same symbol.

In some embodiments, generally fixed height 406 of game play matrix display area 402 may be constant across game play matrix display area 402 such that each column 408 has the same height 406, even though each column 408 may display a different number of symbols 404 or reels 407. In some embodiments, each column 408 may have a fixed height that is different than the fixed height of other columns 408. Additionally, the plurality of columns 408 of adjustable game play matrix 403 shown on EGM screen 400 may include a first column 408 displaying a first number of symbols 404 and a second column 408 displaying a second number of symbols 404, and the first number of symbols 404 and the second number of symbols 404 may be the same, or may be different.

In some embodiments, one or more displayed symbols 404 on adjustable game play matrix 403 may be a different size than the other displayed symbols 404. For example, if symbols 404 to be displayed in first column 408 includes four symbols 404, then two symbols 404 to be displayed may be sized to fill approximately one-sixth of the height (e.g., height 406) of first column 408 and two symbols 404 to be displayed may be sized to fill approximately one-third of the height (e.g., height 406) of first column 408. Accordingly, symbols 404 of different sizes and/or heights may be displayed within the same column 408 of adjustable game play matrix 403.

In some embodiments, EGM screen 400 may display multiple game play matrices 403 within one or more game play matrix display areas 402 (e.g., depending on the electronic game being played). For example, EGM screen 400 may display two game play matrices 403 within respective game play matrix display areas 402, and the randomly determined displayed symbols 404 for each adjustable game play matrix 403 during each spin of the electronic game may be considered independently when determining if one or more awards and/or features (e.g., initiation of a bonus game) should be presented to the player (e.g., the displayed symbols 404 of first and second adjustable game play matrices 403 independently determine if one or more awards and/or features should be presented to the player and/or an amount of the one or more awards and/or features). The adjustable game play matrices 403 may be displayed in any suitable configuration on EGM screen 400 (or on any other suitable display device) that that enables functionality of the electronic game.

In some embodiments, EGM screen 400 may display multiple game play matrices 403 within respective game play matrix display areas 402, and the displayed symbols 404 for all or a subset of the displayed adjustable game play matrices 403 following an instance of the electronic game may be collectively considered to determine if one or more awards and/or features should be presented to the player (e.g., the displayed symbols 404 of all or a subset of the multiple adjustable game play matrices 403 may collectively determine if one or more awards and/or features should be presented to the player and an amount of the one or more awards and/or features). Adjustable game play matrices 403 may be displayed in any suitable configuration on EGM screen 400 (or on any other suitable display device) that enables functionality of the electronic game.

Figure 6:
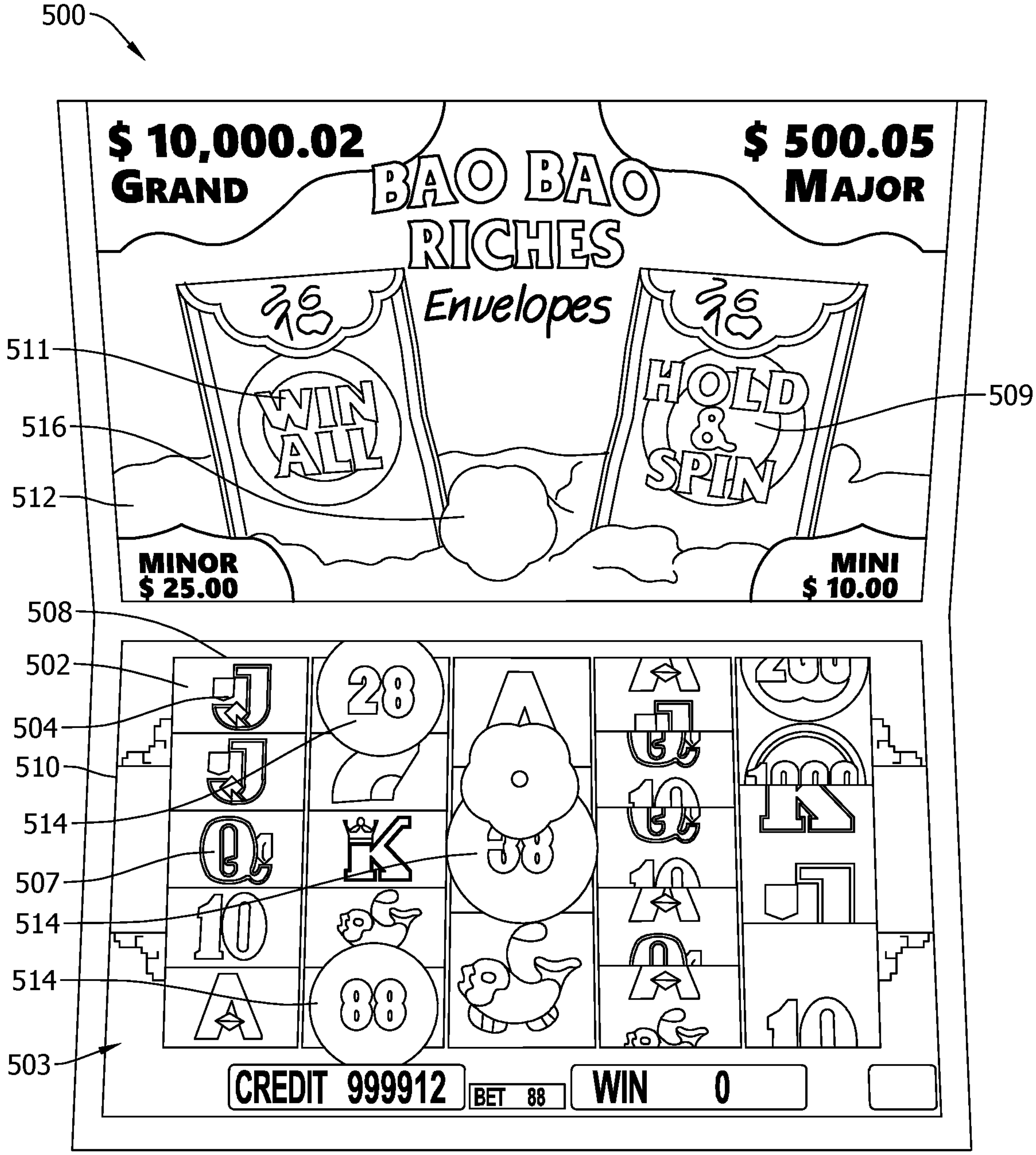
FIG. 6 illustrates another screenshot and/or interface of the electronic game shown in FIG. 4.
Figure 7:
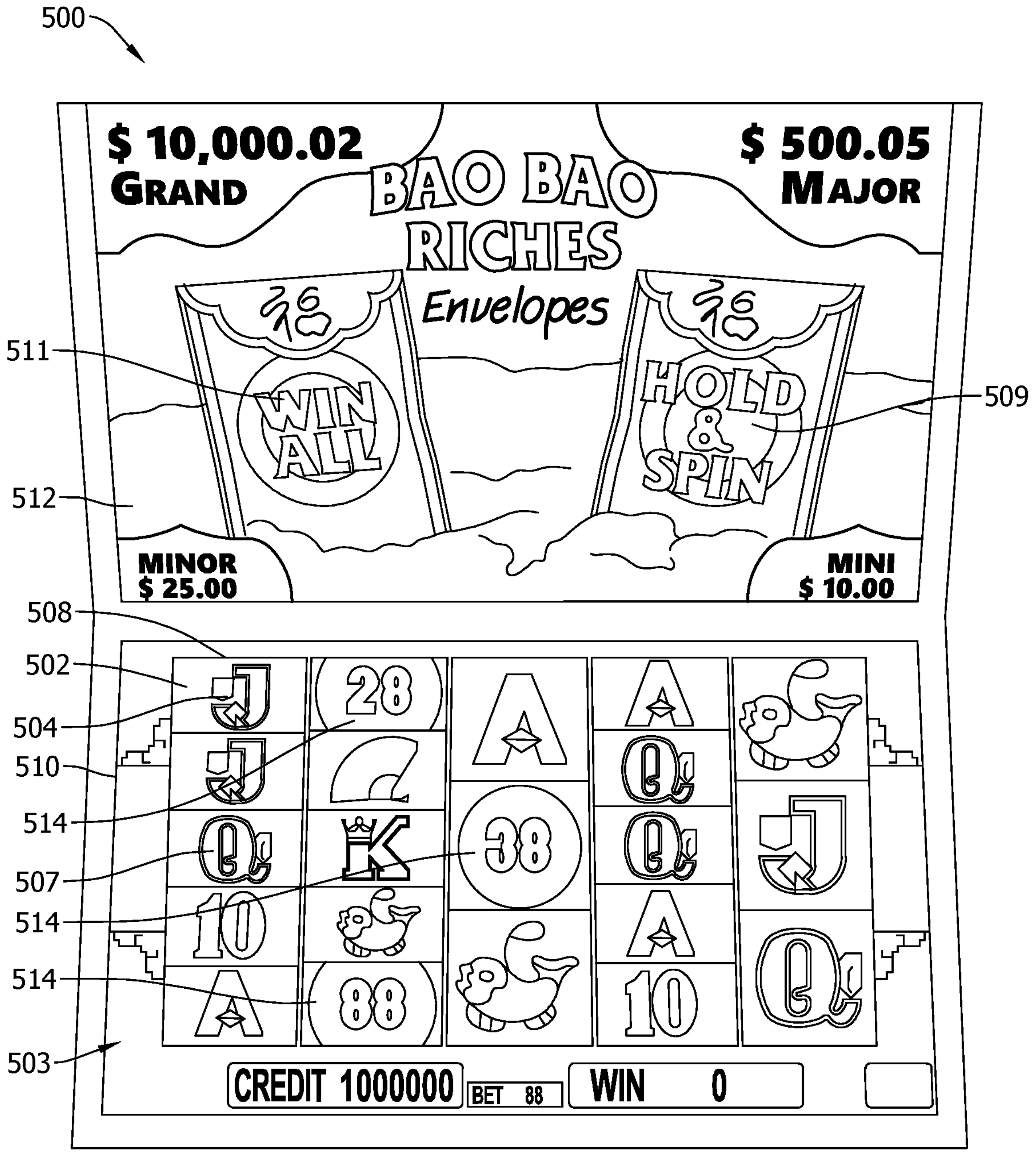
FIG. 7 illustrates another screenshot and/or interface of the electronic game shown in FIG. 4.

FIGS. 5-7 illustrate an example EGM screen 500 of a base game of an electronic game. EGM screen 500 is similar to EGM screen 400, and similar components will have reference numbers increased by 100. For example, reels 507 (e.g., rows) are similar to reels 407.

Additionally, similar methods for determining symbols 404 to display on EGM screen 400 are used for EGM screen 500 (e.g., EGM screen 500 may have a different number of symbols displayed on each column of an adjustable game play matrix that are determined according to one or more of the embodiments described above with respect to EGM screen 400, etc.). Further, similar methods for displaying symbols 404 on EGM screen 400 are used for displaying symbols 504 on EGM screen 500 (e.g., if there are fewer than the maximum number of symbols 504 displayed on a column 508, then displayed symbols 504 are displayed larger than when the maximum number of symbols 504 is displayed in column 508). EGM screen 500 includes a lower display area 510 and an upper display area 512. Lower display area 510 includes a game play matrix display area 502 that displays an adjustable game play matrix 503 (e.g., similar to adjustable game play matrix 403).

More specifically, FIGS. 5-7 illustrate a display sequence that is triggered when a COR symbol 514 is included in the set of displayed symbols 504 (e.g., landed symbols) during the electronic game (e.g., a base game). For example, FIG. 5 illustrates EGM screen 500 prior to the end of an instance or spin of an electronic game in which COR symbols 514 have landed. Each COR symbol 514 may be associated with an output amount that is displayed on EGM screen 500, which may be a credit value or a monetary value. In FIG. 5, symbols 504 in first and second columns 508 on the left side of adjustable game play matrix 503 are statically displayed, while the remaining reels 507 are not yet statically displayed (e.g., the corresponding reels 507 are still spinning).

Further, the base game includes at least two metamorphic symbols, which may include a metamorphic symbol 509 associated with a bonus game (e.g., a hold and spin feature) and a metamorphic symbol 511 associated with another feature (e.g., a win-all feature, where triggering the win-all feature awards the output amounts associated with COR symbols 514 that are currently displayed on EGM screen 500 at the end of the instance or spin), either of which may be triggered when a COR symbol 514 lands when playing the base game. After each COR symbol 514 is landed in the displayed symbols 504 of adjustable game play matrix 503 (e.g., after determining that a first trigger condition is satisfied), an animation showing a coin symbol 516 traveling from COR symbol 514 to upper display area 512 (e.g., near metamorphic symbols 509, 511 of the base game) is displayed, and a controller (e.g., game controller 202) makes a random determination (e.g., using RNG 212 and RNG conversion engine 210, 320) of whether a feature (e.g., a win-all feature) should be awarded or whether a bonus game (e.g., a hold and spin feature) should be initiated. In some embodiments, if the feature is awarded, a player is awarded the output amount associated with all COR symbols 514 that are displayed on EGM screen 500 at the end of the corresponding instance of the base game.

In some embodiments, similar to EGM screen 400, EGM screen 500 may display multiple game play matrices 503 in any suitable configuration (including on different display devices) depending on the electronic game being played, and the symbols 504 displayed on multiple game play matrices 503 may collectively or independently determine whether an award or feature (e.g., initiation of a bonus game) should be presented to a player and/or an amount or type of award and/or feature that should be presented to the player, as described herein with respect to EGM screen 400.

FIG. 6 illustrates a subsequent time during the instance of the base game shown in FIG. 5, with an additional COR symbol 514 in the set of displayed symbols during the spin. In FIG. 6, the symbols 504 in first, second, and third columns 508 on the left side of adjustable game play matrix 503 are statically displayed, while the remaining reels 507 are not yet statically displayed (e.g., are still spinning). As shown in FIG. 6, coin symbols 516 triggered by landing COR symbols 514 are moving toward or within upper display area 512.

FIG. 7 illustrates EGM screen 500 at the end of the instance of the base game shown in FIGS. 5 and 6, with a plurality of symbols 504 displayed in corresponding reels 507. As shown in FIG. 7, three COR symbols 514 (e.g., a first subset of symbols 504) are included in the set or plurality of displayed symbols 504. Accordingly, during or after the preceding instance or spin of the base game, three random determinations of whether a feature should be awarded or whether a bonus game should be initiated were made (e.g., one random determination per COR symbol 514 included in the set of displayed symbols 504).

Figure 8:
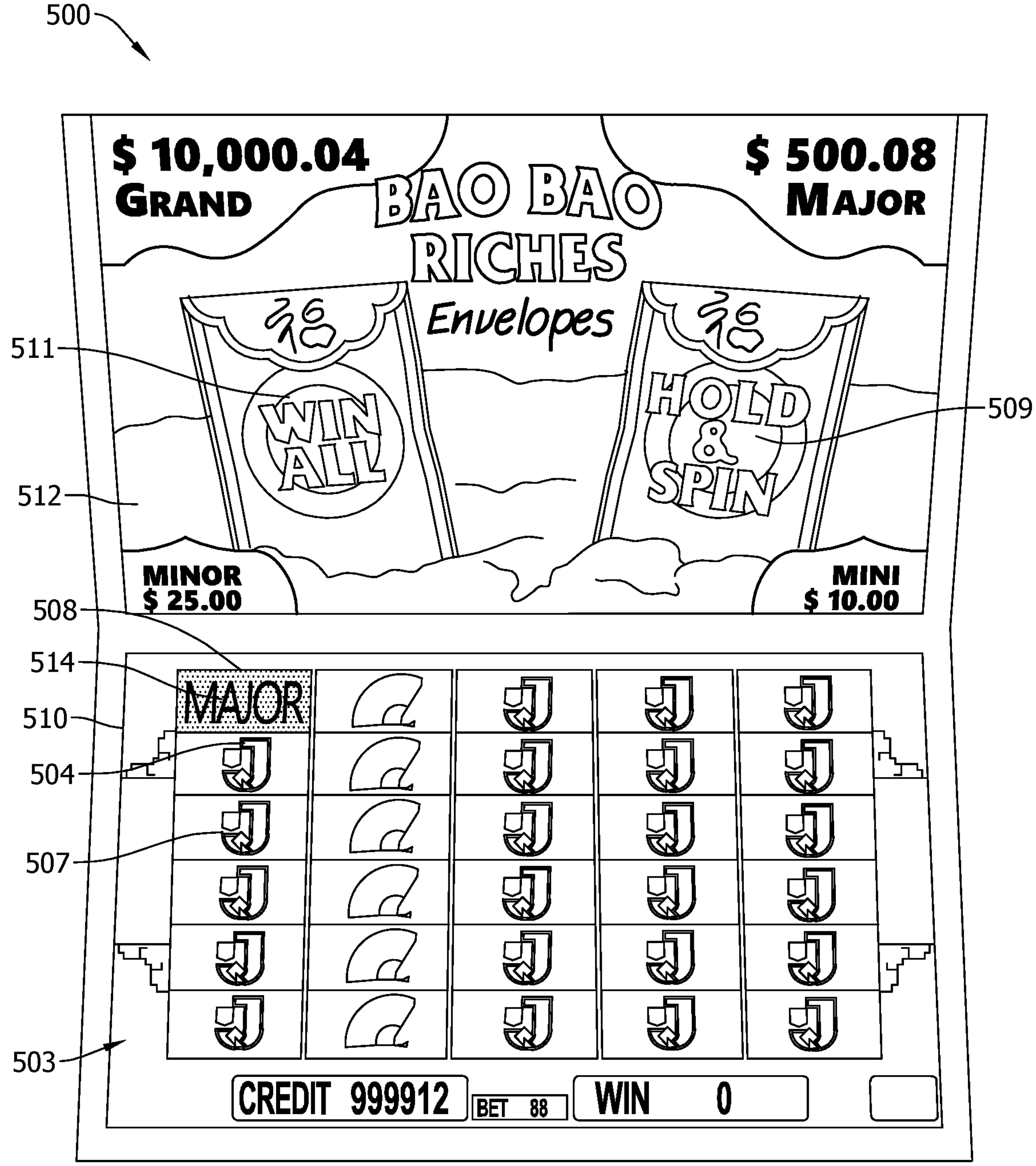
FIG. 8 illustrates another screenshot and/or interface of the electronic game shown in FIG. 4.

FIG. 8 illustrates EGM screen 500 shown in FIG. 7 at the end of a subsequent instance or spin of the base game. As shown in FIG. 8, a COR symbol 514 associated with a feature output amount of "MAJOR" appears in the set of displayed symbols 504. When making the random determination of whether a feature should be awarded or whether a bonus game should be initiated (e.g., via a controller 202, and/or via RNG 212 and RNG conversion engine 210, 320) based on the landed COR symbol 514, it was determined that the hold and spin feature (e.g., a bonus game) should be initiated. In some embodiments, the hold and spin feature may be initiated when a threshold number of COR symbols 514 (e.g., three COR symbols 514) appear in the set of displayed symbols 504 at the end of an instance or spin of the base game.

Figure 9:
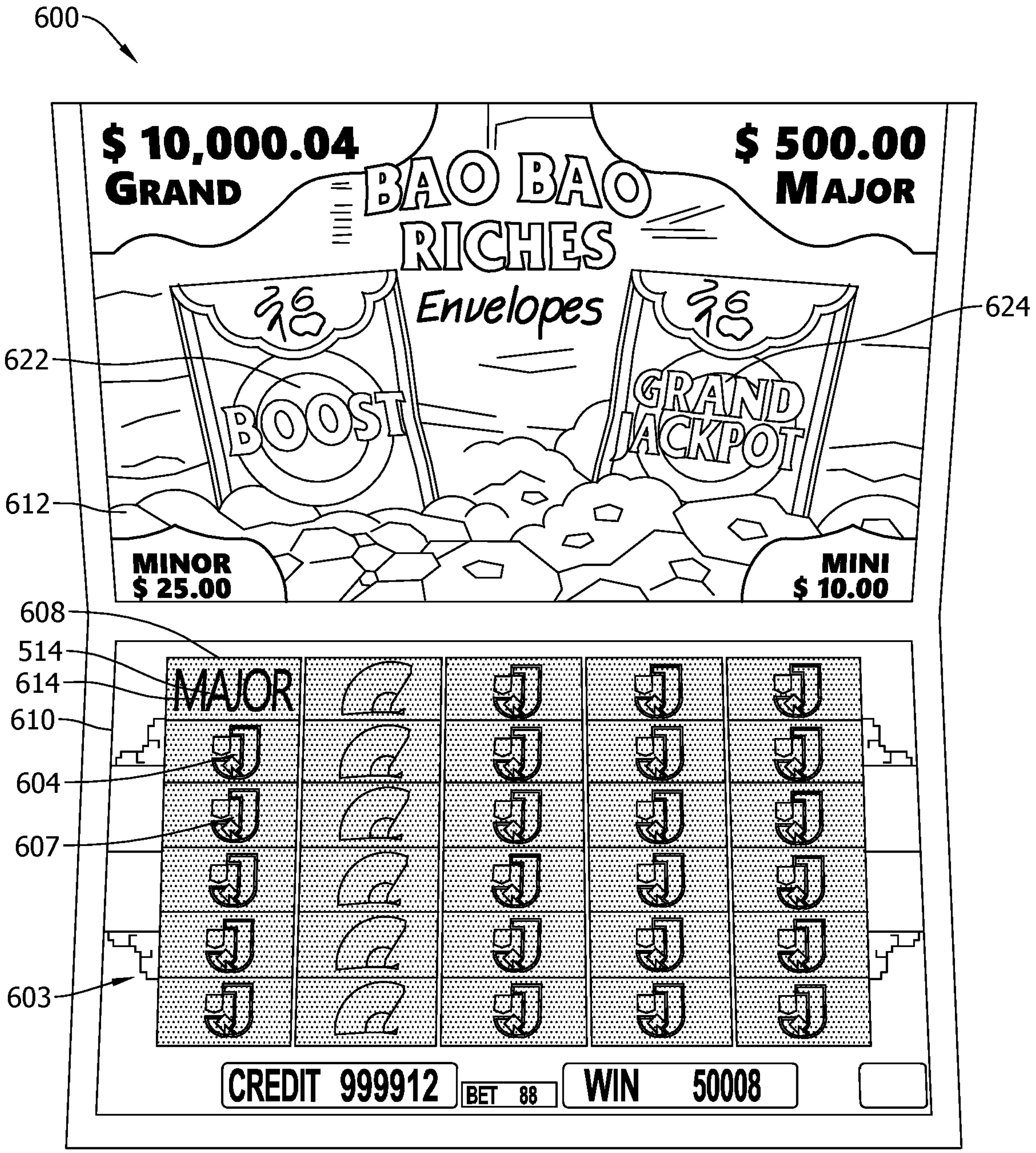
FIG. 9 illustrates an example screenshot and/or interface of another electronic game.

FIGS. 9-12 illustrate an EGM screen 600 of a bonus game (e.g., a hold and spin feature) that was initiated based on the set of displayed symbols 504 shown in FIG. 8, and FIG. 9 shows the initially displayed symbols 604 of the bonus game before subsequent instances or spins. EGM screen 600 is similar to EGM screen 500, and similar components will have reference numbers increased by 100. For example, upper display area 612 of EGM screen 600 is similar to upper display area 512 of EGM screen 500. The bonus game includes at least two metamorphic symbols (e.g., displayed in upper display area 612), an upgrade (e.g., boost) metamorphic symbol 622 corresponding to an upgrade and a feature metamorphic symbol 624 corresponding to a feature, for example, a grand jackpot. COR symbol 514, 614 that was included in the displayed symbols 504 during the preceding instance of the base game remains as part of the displayed symbols 604 on the corresponding reel 607 throughout the bonus game.

In some embodiments, similar to EGM screens 400 and 500, EGM screen 600 may display multiple game play matrices (e.g., multiple adjustable game play matrices) in any suitable configuration (including on different display devices).

In the illustrated embodiment, upon initiation of the bonus game, the number of symbols 504 displayed on each column 508 is locked, and the bonus game is played with the same number of symbols 604 displayed on each column 608 of game play matrix 603 as were displayed on adjustable game play matrix 503 following the instance of the base game after which the bonus game was initiated. That is, game play matrix 603 of the bonus game may not be adjustable and the number of symbols 604 displayed in each column 608 of game play matrix 603 may not change once the bonus game is initiated.

In some embodiments, even when the number of symbols 604 displayed on each column 608 is fixed during the bonus game, similar processes to those described above may be used independently and/or in combination to determine which symbols are displayed at the fixed number of reels 607. For example, during the bonus game in the illustrated embodiment, five symbols 604 may be randomly and independently determined to display at the second through sixth reels 607 (e.g., rows) of first column 608, and six symbols 604 may be randomly and independently determined to display at the first through sixth reels 607 (e.g., rows) of the second through fifth columns 608, respectively. The "MAJOR" COR symbol 614 is "held" in place during the bonus game and does not change during the bonus game (e.g., the "MAJOR" COR symbol 614 is displayed in first reel 607 of first column 608 following each instance of the bonus game).

In some embodiments, during the bonus game in the illustrated embodiment, six symbols are randomly determined for each column of a backend game play matrix, and all six symbols of each column of the backend game play matrix are generally displayed on a corresponding column 608 of game play matrix 603 (e.g., in a randomly determined order) because six symbols were displayed on each column 508 of adjustable game play matrix 503 following the instance of the base game after which the bonus game was initiated. As an exception, symbols 604 determined for reels 607 that display a COR symbol (e.g., COR symbol 614) from a previous instance of the base game and/or bonus game are not displayed because the corresponding COR symbol remains as a part of the displayed symbols 604 on the same reel 607 throughout the bonus game. In some embodiments, a symbol 604 is not randomly determined during the bonus game for reels 607 that display a COR symbol (e.g., COR symbol 614).

In some embodiments, the number of symbols 604 displayed on each column 608 may change during each instance of the bonus game according to one or more of the methods described herein with respect to EGM screen 400 (e.g., a column 608 of game play matrix 603 may display a different number of symbols 604 on different spins).

As shown in FIG. 9, COR symbol 514, 614 that was landed in the set of displayed symbols 504 shown in FIG. 8 (e.g., during the instance of the base game after which the bonus game was initiated) is kept in the initially displayed symbols 604 during the bonus game, and COR symbol 614 remains displayed on that reel 607 throughout the bonus game. In the illustrated embodiment, the bonus game is a hold and spin game in which specific symbols (e.g., COR symbols 614) remain as part of the sets of displayed symbols 604 for subsequent instances of the bonus game.

Figure 10:
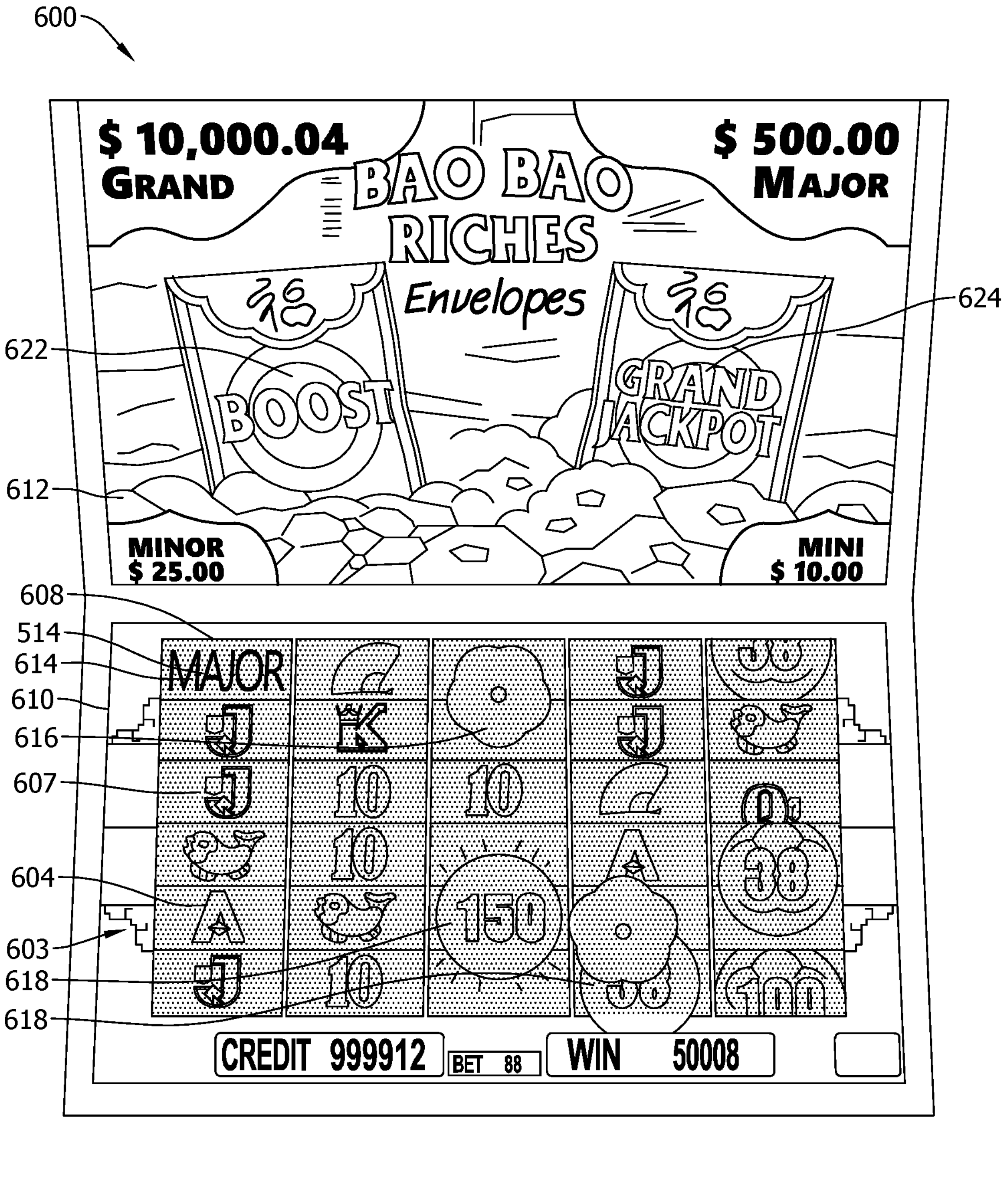
FIG. 10 illustrates another example screenshot and/or interface of the electronic game shown in FIG. 9.

FIG. 10 illustrates EGM screen 600 during a first instance of the bonus game. As shown in FIG. 10, COR symbol 514, 614 landed during the base game remains as part of the sets of displayed symbols 604 during the bonus game, and the remaining displayed symbols 604 are randomly determined (e.g., independently randomly determined). As shown in FIG. 10, additional COR symbols 618 are included in the set of displayed symbols 604 (e.g., a second trigger condition). After each additional COR symbol 618 is included in the set of displayed symbols 604 (e.g., landed), EGM screen 600 displays an animation of a coin symbol 616 corresponding to each additional COR symbol 618 moving to upper display area 612 (e.g., near the metamorphic symbols 622, 624), and a random determination is made by a controller (e.g., using game controller 202 and/or RNG 212 and RNG conversion engine 210, 320) of whether a feature (e.g., grand jackpot) should be awarded or whether an upgrade (e.g., boost) should be initiated. In some embodiments, if the controller determines that the feature should be awarded in the bonus game, the player is awarded an output amount associated with a grand jackpot. In some embodiments, the feature awarded during the bonus game is ineligible to be presented during the base game. In some embodiments, the feature awarded during the bonus game is eligible to be presented during the bonus game when a separate trigger condition is satisfied (e.g., when COR symbols 614 are displayed on all reels 607 of game play matrix 603).

Figure 11:
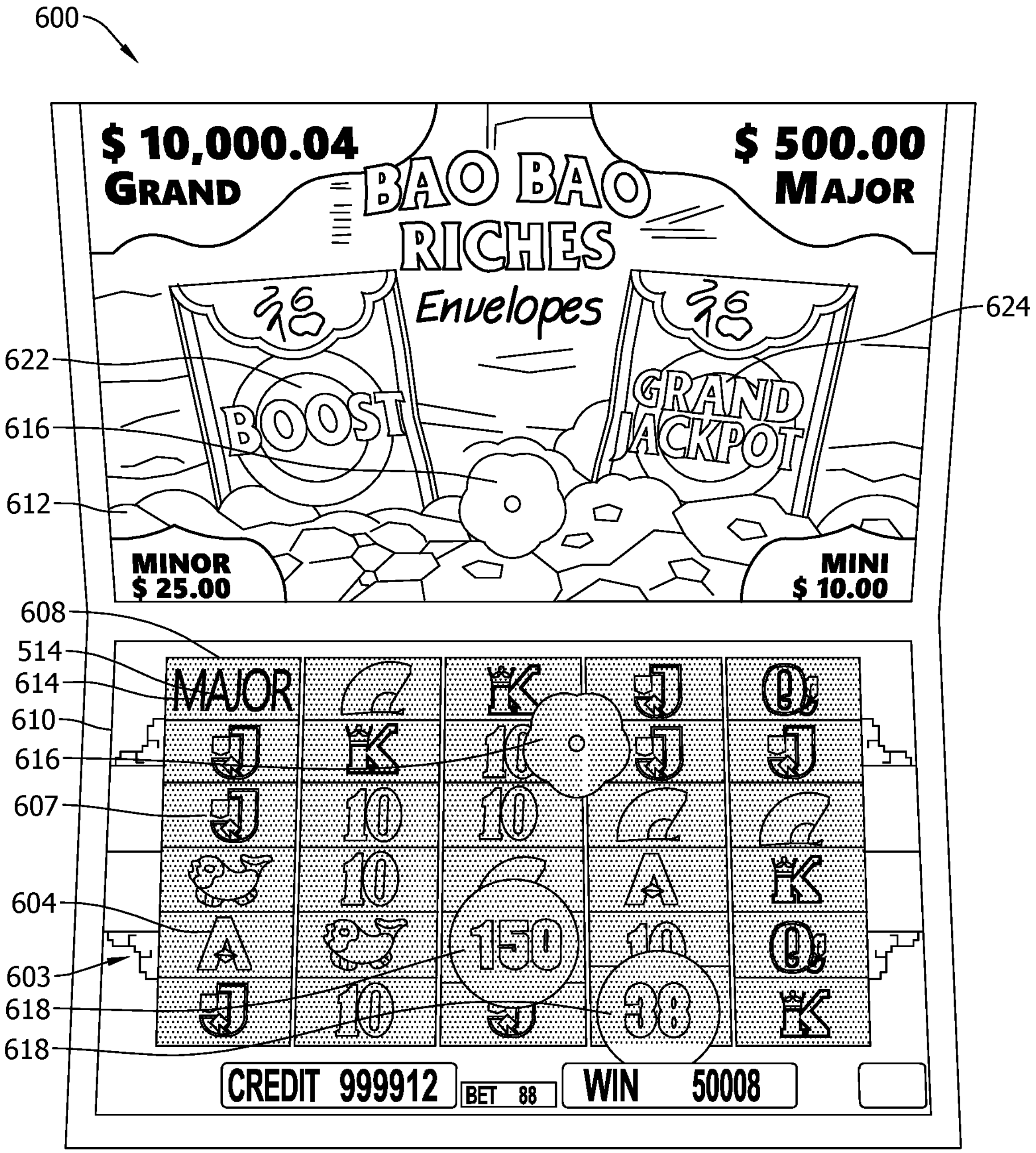
FIG. 11 illustrates another example screenshot and/or interface of the electronic game shown in FIG. 9.

FIG. 11 illustrates a subsequent time during the instance of the bonus game shown in FIG. 10, with animations of coin symbols 616 triggered by landing additional COR symbols 618 (e.g., COR symbols 618 associated with output amounts of "150" and "38", respectively) moving toward or within upper display area 612. In FIG. 11, symbols 604 in first, second, third, and fourth columns 608 on the left side of game play matrix 603 are statically displayed, while the remaining reels 607 are not yet statically displayed (e.g., are still spinning).

Figure 12:
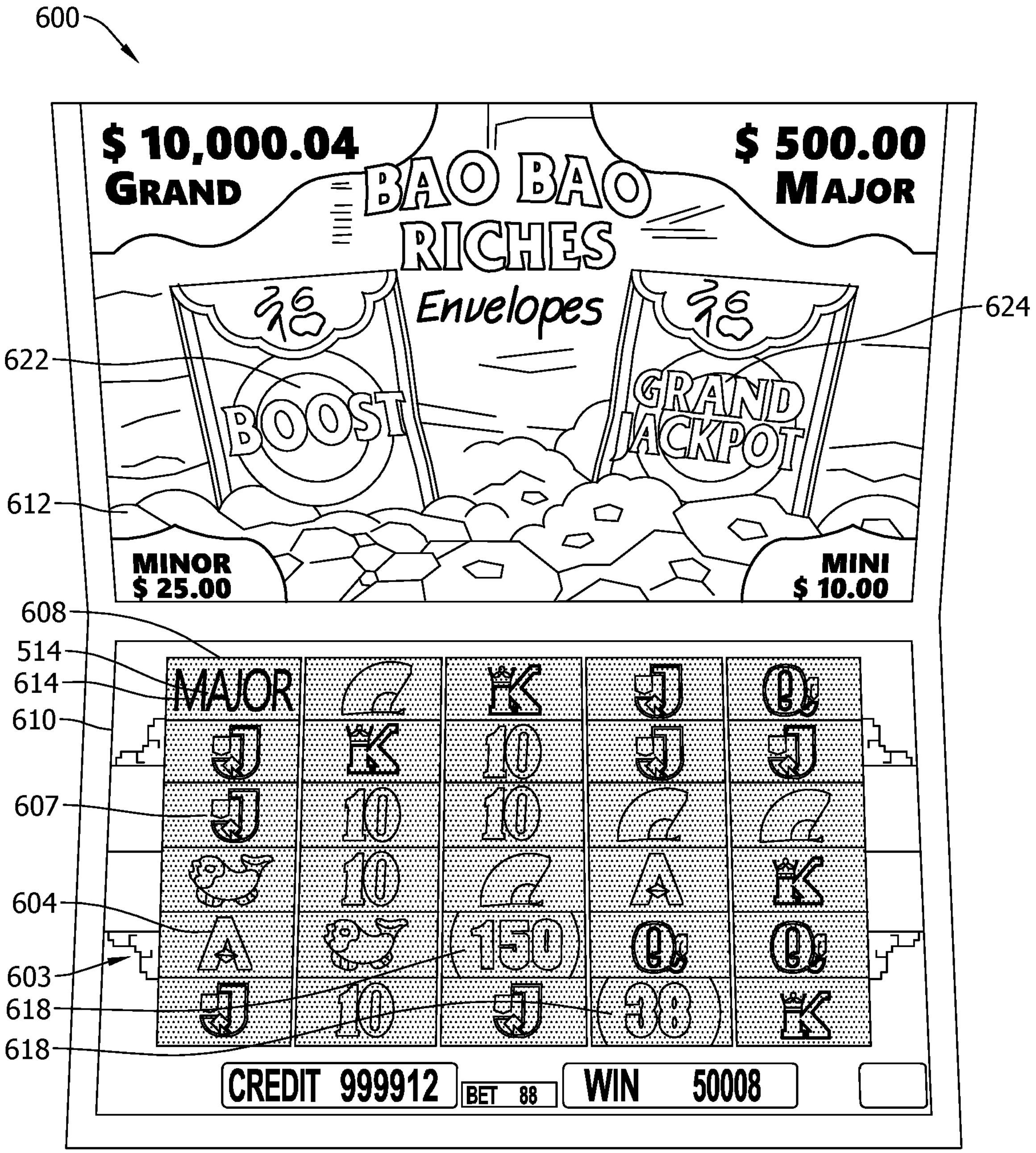
FIG. 12 illustrates another example screenshot and/or interface of the electronic game shown in FIG. 9.

FIG. 12 illustrates displayed symbols 604 after the first instance of the bonus game. As shown in FIG. 12, two additional COR symbols 618 are included in the set of displayed symbols 604 following the first instance of the bonus game, yielding a total of three COR symbols 614, 618 in the set of displayed symbols (the COR symbol 514, 614 landed during the base game and carried over to the bonus game plus the additional COR symbols 618 landed during the first instance of the bonus game). COR symbols 614, 618 that are shown in FIG. 12 remain as part of the subsequent sets of displayed symbols 604 during subsequent instances of the bonus game. Additional COR symbols 618 landed during subsequent instances of the bonus game also become part of the set of displayed symbols 604 for later instances in the bonus game. In some embodiments, upon landing each additional COR symbol 618, a player may be awarded additional instances or spins during the bonus game (e.g., for each additional COR symbol 618 landed, a player may be awarded three additional instances or spins).

Figure 13:
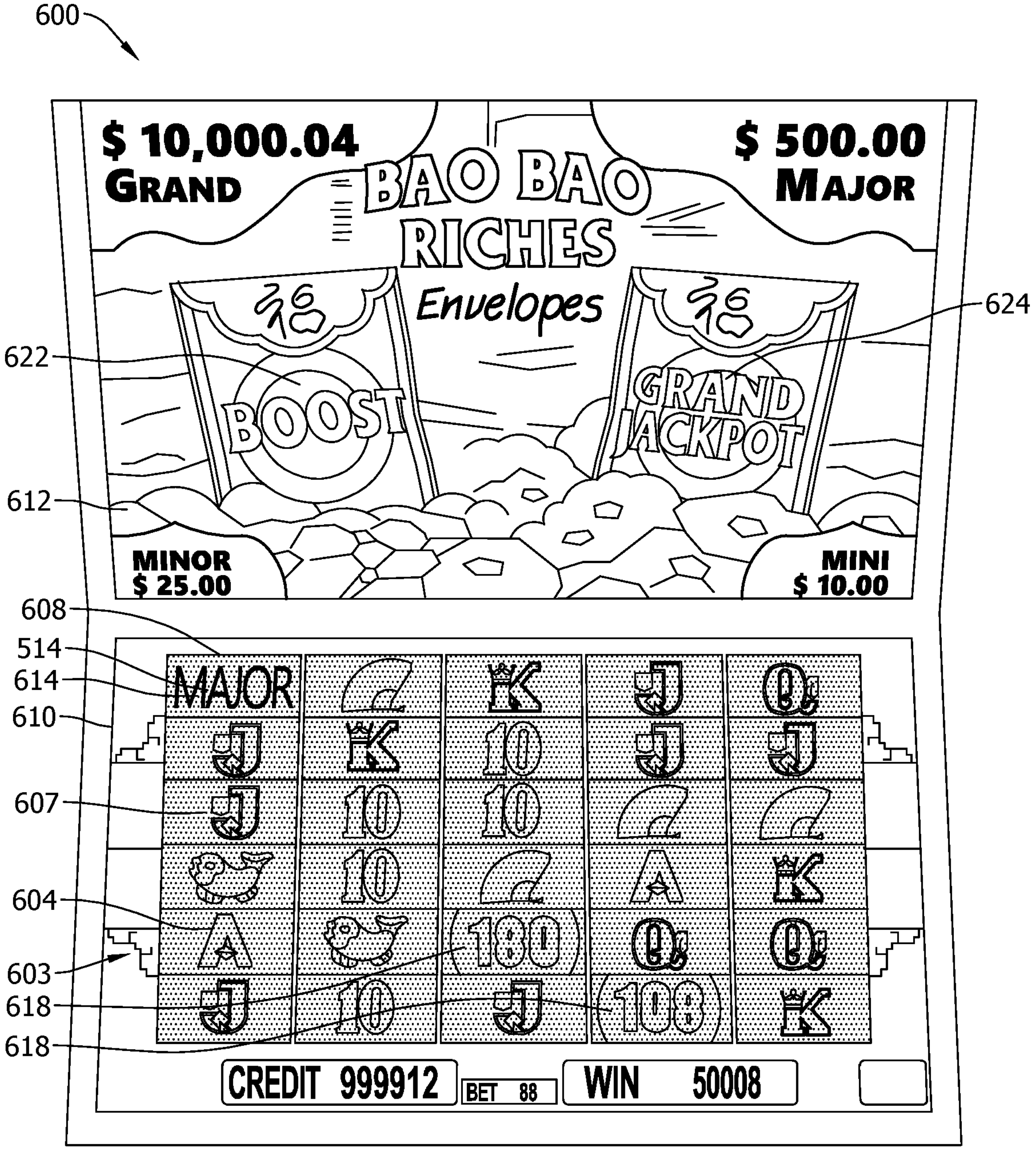
FIG. 13 illustrates another example screenshot and/or interface of the electronic game shown in FIG. 9.

FIG. 13 illustrates EGM screen 600 shown in FIG. 12, with an upgrade applied to some of the output amounts associated with COR symbols 618. When an additional COR symbol 618 is part of the set of displayed symbols 604 following an instance of the bonus game and a random determination is made by the controller to initiate an upgrade, an upgrade amount is randomly determined (e.g., using RNG 212 and RNG conversion engine 210, 320). In some embodiments, the upgrade amount may be randomly distributed among all or a subset of COR symbols 614, 618 that are currently part of the set of displayed symbols 604 of the bonus game.

With reference to the set of displayed symbols 604 shown in FIGS. 12 and 13, if an upgrade amount of 100 credits is randomly determined (e.g., using RNG 212 and RNG conversion engine 210, 320), then 100 credits may be distributed to some of or all COR symbols 614, 618 currently in the set of displayed symbols (e.g., as shown in FIG. 12) such that COR symbol 618 associated with a first output amount of "150" is upgraded to be associated with a second output amount of "180" (increased the output amount by 30), and COR symbol 618 associated with an output amount of "38" is changed to be associated with an output amount of "108" (increased the output amount by 70), as shown in FIG. 13 (e.g., for a total upgrade of 100 credits distributed among two COR symbols 618). In some embodiments, the output amount of all or a subset of COR symbols 614, 618 in the set of displayed symbols 604 may be increased by the randomly determined upgrade amount. In some embodiments, the output amount associated with all or a subset of COR symbols 614, 618 included in the set of displayed symbols 604 may be increased such that the second (e.g., new) output amount associated with COR symbols 614, 618 is a feature output amount (e.g., major jackpot, minor jackpot, etc.). In some embodiments, the output amount associated with all or a subset of COR symbols 614, 618 included in the set of displayed symbols 604 may be changed such that each COR symbol 614, 618 is associated with the same output amount.

In some embodiments, the randomly determined upgrade amount may be randomly distributed to the output amounts associated with COR symbols 614, 618 included in the set of displayed symbols 604 over multiple spins. For example, if COR symbol 618 in FIG. 12 associated with an output amount of "150" is included in the set of displayed symbols 604 shown in FIG. 12, and a random determination is made by the controller to initiate an upgrade of 150 credits that is randomly determined (e.g., using RNG 212 and RNG conversion engine 210, 320) to be distributed over the current set of displayed symbols 604 and the set of displayed symbols 604 following the next instance of the bonus game, then it may be randomly determined (e.g., using RNG 212 and RNG conversion engine 210, 320) that 100 credits of the 150 credits should be distributed among all or a subset of the output amounts associated with COR symbols 614, 618 in the set of displayed symbols 604 shown in FIG. 12 such that the output amounts associated with all or a subset of COR symbols 614, 618 shown in FIG. 12 are increased by a combined total of 100 credits (e.g., yielding the set of displayed symbols shown in FIG. 13).

As shown in FIG. 13, COR symbol 618 that was previously associated with a first output amount of "150" (e.g., as shown in FIG. 12) was upgraded to be associated with a second output amount of "180" (increased the output amount by 30 credits), and COR symbol 618 that was previously associated with a first output amount of "38" (e.g., as shown in FIG. 12) was upgraded to be associated with a second output amount of "108" (increased the output amount by 70 credits), such that an upgrade of 100 credits was randomly distributed to increase some or all of the output amounts associated with COR symbols 614, 618 shown in FIG. 12 to yield the set of displayed symbols 604 shown in FIG. 13.

Figure 14:
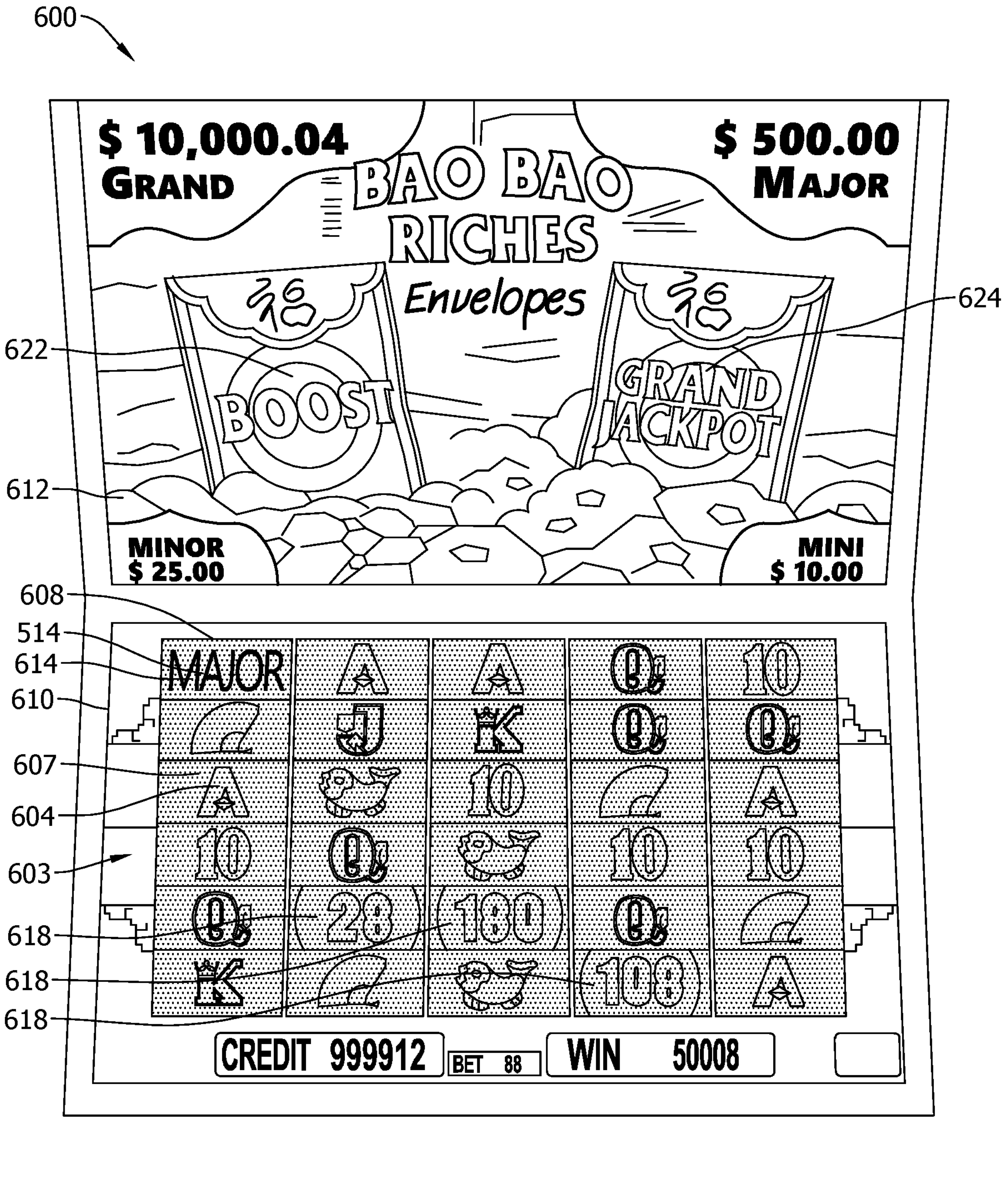
FIG. 14 illustrates another example screenshot and/or interface of the electronic game shown in FIG. 9.

The remaining upgrade amount of 50 credits may be distributed among the output amounts associated with all or a subset of COR symbols 614, 618 in the set of displayed symbols 604 following one or more subsequent instances of the bonus game. For example, FIG. 14 shows the set of displayed symbols 604 of the bonus game following a second instance of the bonus game (e.g., the instance following the set of displayed symbols 604 shown in FIG. 13), and a random selection (e.g., made using RNG 212 and RNG conversion engine 210, 320) of all or a subset of the output amounts associated with COR symbols 614, 618 in the set of displayed symbols 604 shown in FIG. 14 may be increased by all or a portion of the remaining 50 credits of the randomly determined upgrade that was determined after the first instance of the bonus game. The output amounts of COR symbols 614, 618 that were part of a previous set of displayed symbols 604 and that remain part of subsequent sets of displayed symbols 604 of the bonus game and additional or new COR symbols 618 that are part of the subsequent sets of displayed symbols 604 of the bonus game during subsequent instances may be upgraded based on the initial or remaining upgrade amount.

Figure 15:
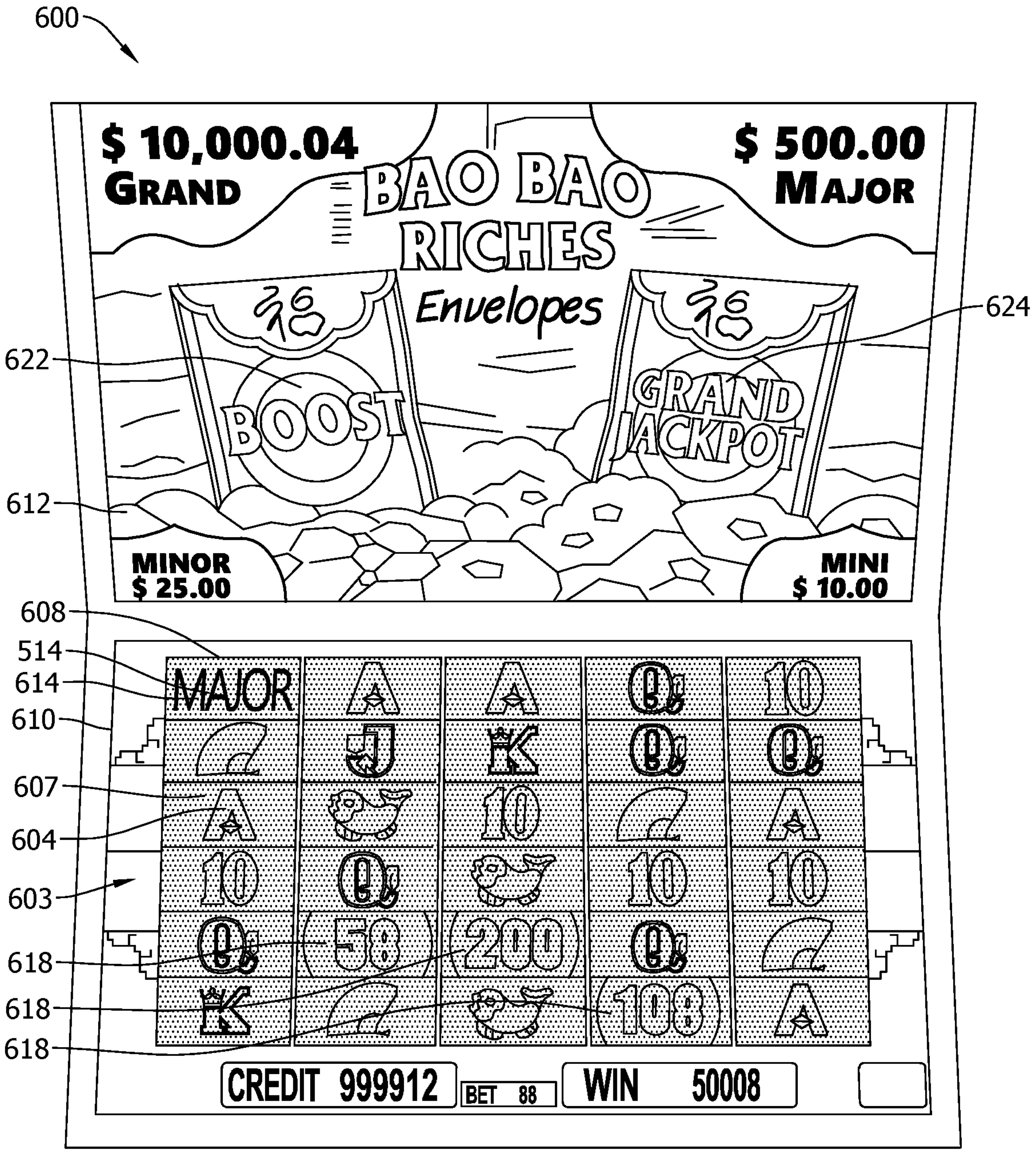
FIG. 15 illustrates another example screenshot and/or interface of the electronic game shown in FIG. 9.

For example, FIG. 15 illustrates EGM screen 600 following the distribution of the remaining portion of the randomly determined upgrade (50 credits) to output amounts associated with COR symbols 614, 618 in the set of displayed symbols following the second instance of the bonus game. As shown in FIG. 15, COR symbols 618 that were previously associated with output amounts of "28" and "180" following the second instance of the bonus game (e.g., as shown in FIG. 14) were upgraded to be associated with output amounts of "58" and "200", respectively, while the remaining COR symbols 614, 618 remain associated with the same output amounts (e.g., "MAJOR" and "108", respectively) as shown in FIG. 14. That is, remaining portions of the randomly determined upgrade (50 credits) were distributed between the output amounts associated with two COR symbols 618 included in the set of displayed symbols 604 following the second instance of the bonus game.

In some embodiments, the randomly determined upgrade may be distributed only to the output amounts associated with COR symbols 614, 618 that are part of the set of displayed symbols 604 of the bonus game during or following the same instance of the bonus game in which the upgrade amount was triggered and randomly determined.

In some embodiments, the randomly determined upgrade may be distributed to a random selection of all or a subset of the output amounts of COR symbols 614, 618 over multiple spins (e.g., over 2 spins, 3 spins, 4 spins, etc.), where output amounts of COR symbols 614, 618 that were included in the previous set of displayed symbols 604 and that remain part of the subsequent sets of displayed symbols 604 of the bonus game and additional or new COR symbols 618 that are included in the subsequent sets of displayed symbols 604 of the bonus game resulting from subsequent instances may be upgraded based on the initial or remaining upgrade amount during or following each instance or spin.

In some embodiments, during the base game and/or the bonus game, a controller (e.g., game controller 202) may randomly determine that one or more of the reels (e.g., reels 407, 507, 607) should be split to include multiple sub-reels. FIG. 16 illustrates an example reel 700 that displays multiple symbols or sub-symbols 702. Variations of reels 700 may replace one or more reels 407, 507, 607, as described herein. If the controller randomly determines that one or more displayed reels 407, 507, 607 should be split into multiple sub-reels, then two or more sub-reels may take the place of the corresponding reel 407, 507, 607, and the controller may randomly determine respective sub-symbols 702 that correspond to the two or more sub-reels. Once two or more sub-symbols 702 corresponding to the two or more sub-reels are determined, two or more sub-symbols 702 corresponding to the two or more sub-reels take the place of the corresponding reel 407, 507, 607 in adjustable game play matrix 403, 503, 603.

In some embodiments, sub-symbols 702 corresponding to the two or more sub-reels may be determined independently of each other and/or of all other symbols (e.g., each sub-reel may be its own independently spinning reel). In some embodiments, two or more sub-symbols 702 corresponding to the two or more sub-reels may be determined dependently of one another (e.g., each two or more sub-reels corresponding to the same reel 407, 507, 607 may collectively be a spinning reel).

With reference to the second embodiment of dynamic symbol display (e.g., that includes the backend game play matrix), if the controller determines that (i) a reel of the backend game play matrix should be split into two or more sub-reels, and (ii) the reel of the corresponding to the two or more sub-reels should be displayed on an EGM screen (e.g., EGM screen 400, 500, 600) during an instance of an electronic game (e.g., a base game or a bonus game), then the EGM screen displays the two or more sub-reels within the corresponding reel (e.g., reel 407, 507, 607). For example, the reel 700 shown in FIG. 16 may be displayed within reel 407 shown in FIG. 4 that is in the left-most column 408 and the second row from the top.

With reference to any embodiment, if the controller determines that a reel (e.g., reel 407, 507, 607) of adjustable game play matrix (e.g., adjustable game play matrix 403, 503, 603) should be split into two or more sub-reels, then the two or more sub-reels (with corresponding sub-symbols 702) are displayed in place of the corresponding reel.

With reference to any embodiment, the controller may randomly determine to split one or more reels of backend game play matrix and/or adjustable game play matrix (e.g., adjustable game play matrix 403, 503, 603) into multiple sub-reels before, during, or after a spin of the electronic game (e.g., the base game or the bonus game described herein). If the controller randomly determines that a reel of the adjustable game play matrix should be split into multiple sub-reels before or during a spin of the base game, then an animation showing the corresponding reel splitting into multiple sub-reels may be displayed, and an animation of the multiple sub-reels spinning as a single reel or as independent reels may be shown on the EGM screen (e.g., EGM screen 400, 500, 600). The displayed symbols following the instance of the electronic game may include the randomly determined sub-symbols 702 displayed within the corresponding reel (e.g., reel 407, 507, 607).

In some embodiments, if the controller randomly determines that a reel of the adjustable game play matrix (e.g., adjustable game play matrix 403, 503, 603) should be split into multiple sub-reels after an instance of the base game, then an animation of the corresponding reel (e.g., reel 407, 507, 607) in the adjustable game play matrix transitioning to display multiple sub-symbols 702 on respective sub-reels in place of the symbol determined for the corresponding reel may be displayed.

Figure 20:
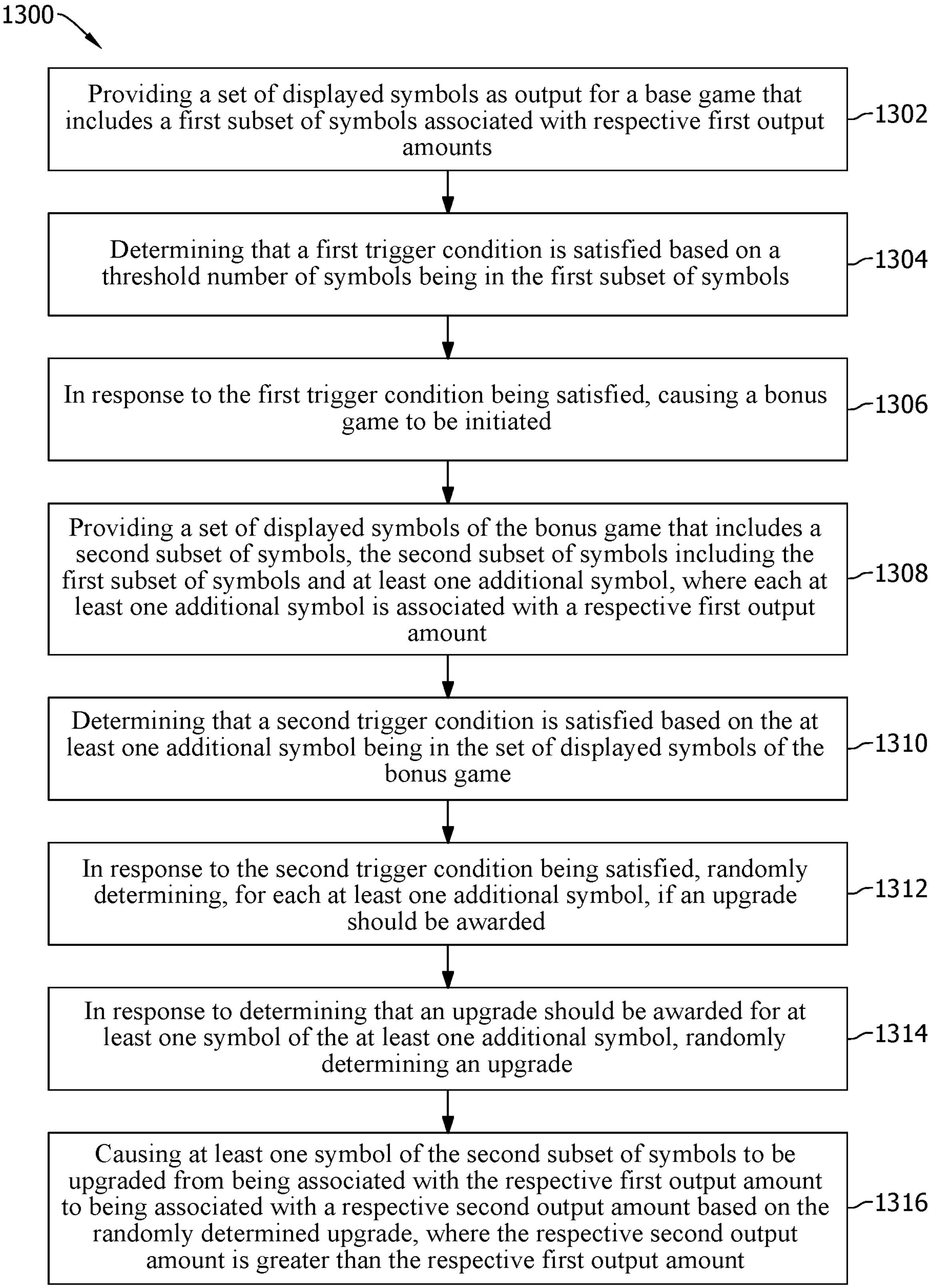
FIG. 20 is a flowchart illustrating another example method of electronic gaming, in accordance with the present disclosure.

For example, with reference to FIG. 4, an animation may show symbol 404 displayed in reel 407 transitioning to display sub-reels with corresponding sub-symbols 702 within reel 700 (e.g., as shown in FIG. 20). Symbol 404 displayed before the transition animation and/or the sub-symbols 702 displayed after the transition animation may be used to determine if an award and/or feature should be presented to a player and/or an amount of an award and/or feature to be presented to the player.

In some embodiments, if a symbol is randomly determined for a reel (e.g., reel 407, 507, 607) of the adjustable game play matrix (e.g., adjustable game play matrix 403, 503, 603), and the controller randomly determines that the reel should be split into multiple sub-reels, then the symbol that was originally determined for the reel may affect the determination of the corresponding multiple sub-symbols 702. For example, if the controller randomly determines a COR symbol (e.g., COR symbols 514, 614, 618) associated with a credit value of 100 for a reel of the adjustable game play matrix, and the controller randomly determines that the same reel should be split into multiple sub-reels, then the controller may determine that the sub-symbols 702 corresponding to the sub-reels should each be COR symbols that are each associated with credit values that collectively sum to the credit value to which the COR symbol that was initially determined for the corresponding reel is associated with (e.g., a COR symbol associated with a credit value of 100 may be split into two sub-symbols 702 that are each COR symbols associated with credit values of 25 and 75, respectively).

In some embodiments, the controller may randomly determine if a reel (e.g., reel 407, 507, 607) of the adjustable game play matrix (e.g., adjustable game play matrix 403, 503, 603) or backend game play matrix should be split into multiple sub-reels before a corresponding symbol is randomly determined for that reel. For example, the controller may randomly determine that a reel should be split into multiple sub-reels, and then the controller may randomly determine a sub-symbol 702 for each of the sub-reels, without determining a corresponding symbol for that reel.

In some embodiments, a probability of the controller randomly determining that a reel of the adjustable game play matrix (e.g., adjustable game play matrix 403, 503, 603) should be split into multiple sub-reels may increase when the number of symbols to be displayed on the corresponding column (e.g., column 408, 508, 608) of the adjustable game play matrix is lower than the number of symbols to be displayed on another column of the adjustable game play matrix. For example, with reference to FIG. 4, if the controller randomly determines that a first column 408 of adjustable game play matrix 403 should display four symbols 404 and a second column 408 of adjustable game play matrix 403 should display six symbols 404, then the probability that a reel of adjustable game play matrix 403 in first column 408 is split into multiple sub-reels may be higher than that of second column 408. That is, preference of which column 408 of adjustable game play matrix 403 should display multiple sub-symbols 702 instead of one symbol 404 within a reel 407 may be given to columns 408 that are randomly determined to display fewer symbols 404. Accordingly, each of the corresponding sub-symbols 702 may be displayed over a larger area of a column 408 (e.g., using the resizing techniques described herein), which facilitates easier viewing by a player.

In some embodiments, if sub-symbols are displayed on one or more reels (e.g., reels 407, 507) following an instance of an electronic game (e.g., a base game), and if the controller randomly determines that a secondary game (e.g., a bonus game) should be initiated (e.g., based on a COR symbol present in the displayed symbols) following that instance of the electronic game, then the multiple sub-reels may be carried into the game play matrix (e.g., game play matrix 603) of the secondary or bonus game, such that the secondary or bonus game is played using the multiple sub-reels in place of the corresponding reel.

Figure 17:
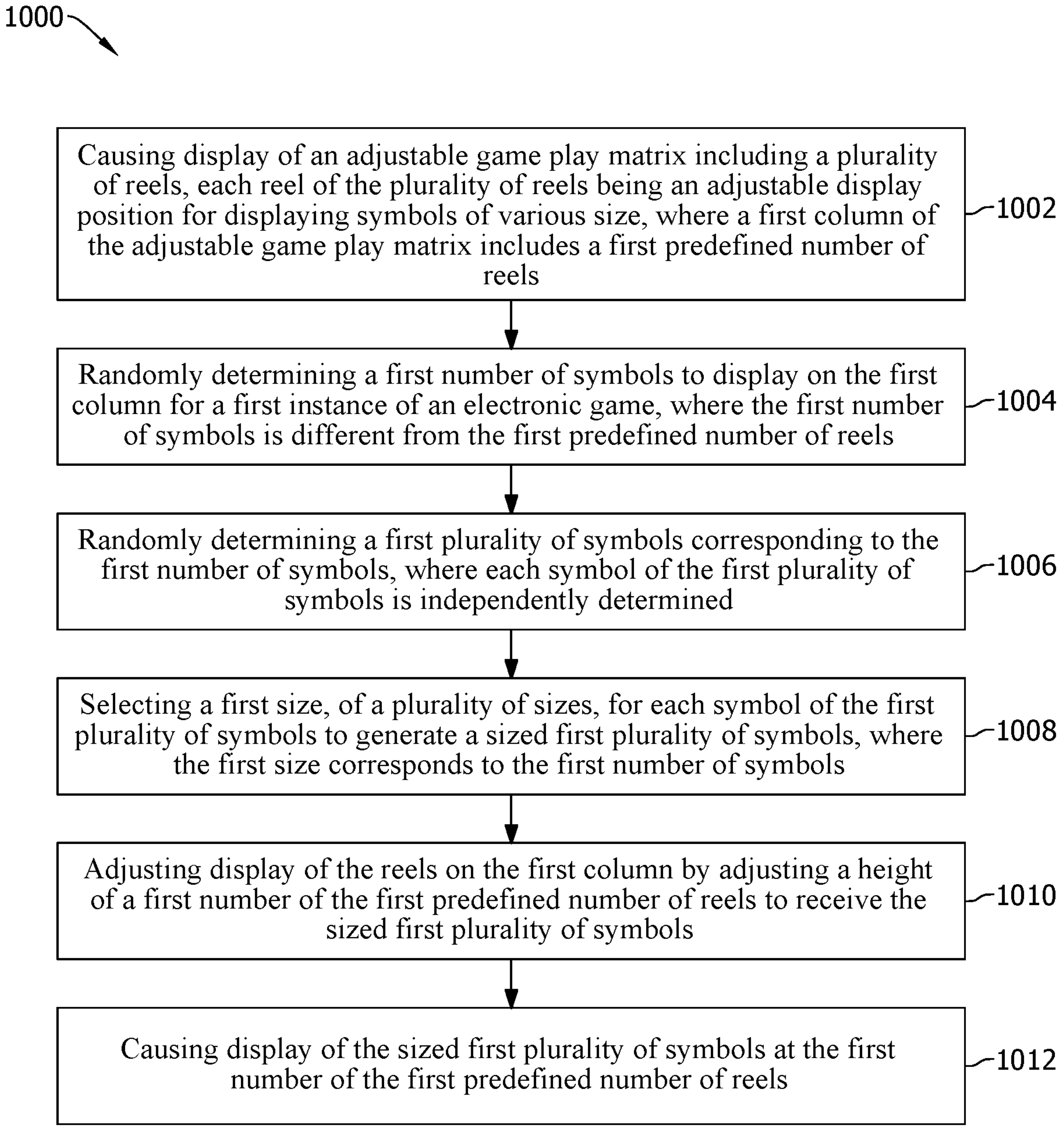
FIG. 17 is a flowchart illustrating an example method of electronic gaming, in accordance with the present disclosure.

FIG. 17 illustrates an example method 1000 of electronic gaming. In the example embodiment, method 1000 includes causing display 1002 of an adjustable game play matrix (e.g., adjustable game play matrix 403) including a plurality of reels (e.g., reels 407), each reel of the plurality of reels being an adjustable display position for displaying symbols (e.g., symbols 404) of various size, where a first column (e.g., of columns 408) of the adjustable game play matrix includes a first predefined number of reels (e.g., six).

In the example embodiment, method 1000 also includes randomly determining 1004 a first number of symbols to display on the first column for a first instance of an electronic game, where the first number of symbols (e.g., four) is different from the first predefined number of reels.

In the example embodiment, method 1000 also includes randomly determining 1006 a first plurality of symbols (e.g., symbols 404) corresponding to the first number of symbols, where each symbol of the first plurality of symbols is independently determined.

In the example embodiment, method 1000 also includes selecting 1008 a first size, of a plurality of sizes, for each symbol of the first plurality of symbols to generate a sized first plurality of symbols, where the first size corresponds to the first number of symbols.

In the example embodiment, method 1000 also includes adjusting display 1010 of the reels on the first column by adjusting a height of a first number of the first predefined number of reels to receive the sized first plurality of symbols.

In the example embodiment, method 1000 also includes causing display 1012 of the sized first plurality of symbols at the first number of the first predefined number of reels.

Figure 18:
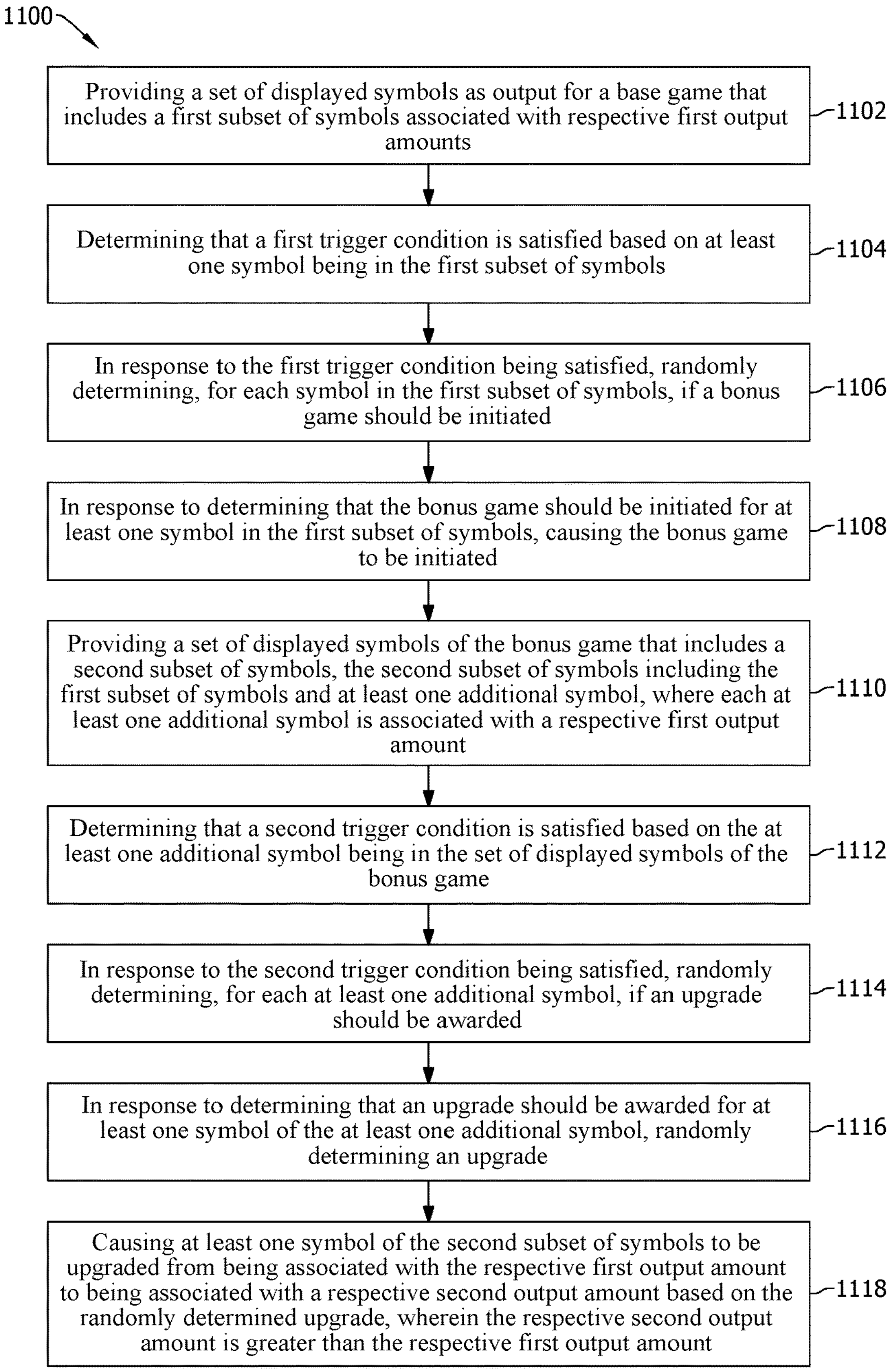
FIG. 18 is a flowchart illustrating another example method of electronic gaming, in accordance with the present disclosure.

FIG. 18 illustrates an example method 1100 of electronic gaming. In the example embodiment, method 1100 includes providing 1102 a set of displayed symbols (e.g., symbols 504) as output for a base game that includes a first subset of symbols associated with respective first output amounts (e.g., COR symbols 514).

In the example embodiment, method 1100 also includes determining 1104 that a first trigger condition is satisfied based on at least one symbol being in the first subset of symbols.

In the example embodiment, method 1100 also includes, in response to the first trigger condition being satisfied, randomly determining 1106, for each symbol in the first subset of symbols, if a bonus game should be initiated.

In the example embodiment, method 1100 also includes, in response to determining that the bonus game should be initiated for at least one symbol in the first subset of symbols, causing 1108 the bonus game to be initiated.

In the example embodiment, method 1100 also includes providing 1110 a set of displayed symbols (e.g., symbols 604) of the bonus game that includes a second subset of symbols, the second subset of symbols including the first subset of symbols and at least one additional symbol (e.g., an additional COR symbol 618), where each at least one additional symbol is associated with a respective first output amount.

In the example embodiment, method 1100 also includes determining 1112 that a second trigger condition is satisfied based on the at least one additional symbol being in the set of displayed symbols of the bonus game.

In the example embodiment, method 1100 also includes, in response to the second trigger condition being satisfied, randomly determining 1114, for each at least one additional symbol, if an upgrade should be awarded.

In the example embodiment, method 1100 also includes, in response to determining that an upgrade should be awarded for at least one symbol of the at least one additional symbol, randomly determining 1116 an upgrade.

In the example embodiment, method 1100 also includes causing 1118 at least one symbol of the second subset of symbols to be upgraded from being associated with the respective first output amount to being associated with a respective second output amount based on the randomly determined upgrade, where the respective second output amount is greater than the respective first output amount.

Figure 19:
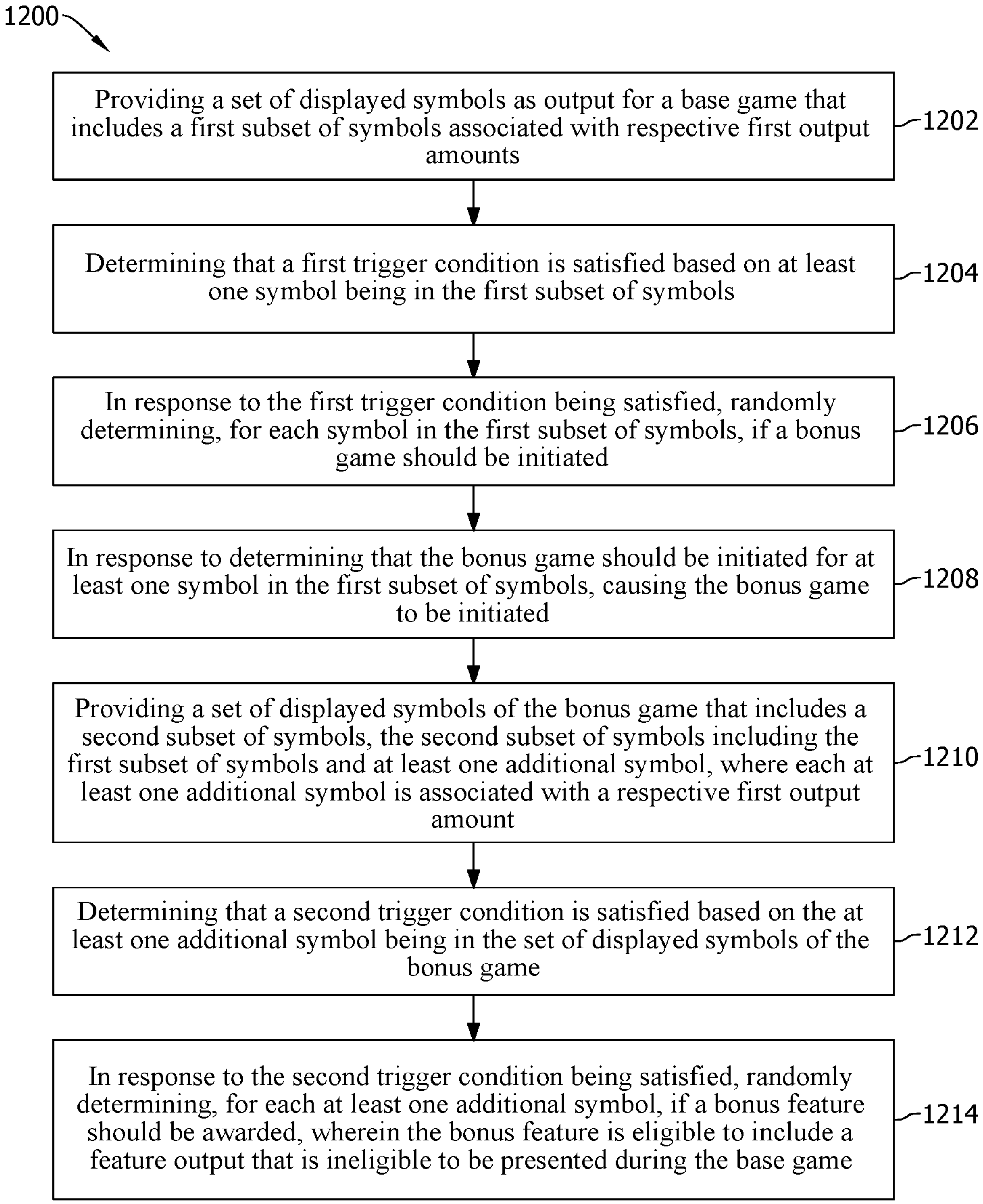
FIG. 19 is a flowchart illustrating another example method of electronic gaming, in accordance with the present disclosure.

FIG. 19 illustrates an example method 1200 of electronic gaming. In the example embodiment, method 1200 includes providing 1202 a set of displayed symbols (e.g., symbols 504) as output for a base game that includes a first subset of symbols associated with respective first output amounts (e.g., COR symbols 514).

In the example embodiment, method 1200 also includes determining 1204 that a first trigger condition is satisfied based on at least one symbol being in the first subset of symbols.

In the example embodiment, method 1200 also includes, in response to the first trigger condition being satisfied, randomly determining 1206, for each symbol in the first subset of symbols, if a bonus game should be initiated.

In the example embodiment, method 1200 also includes, in response to determining that the bonus game should be initiated for at least one symbol in the first subset of symbols, causing 1208 the bonus game to be initiated.

In the example embodiment, method 1200 also includes providing 1210 a set of displayed symbols of the bonus game (e.g., symbols 604) that includes a second subset of symbols, the second subset of symbols including the first subset of symbols and at least one additional symbol, where each at least one additional symbol is associated with a respective first output amount (e.g., COR symbols 618).

In the example embodiment, method 1200 also includes determining 1212 that a second trigger condition is satisfied based on the at least one additional symbol being in the set of displayed symbols of the bonus game.

In the example embodiment, method 1200 also includes, in response to the second trigger condition being satisfied, randomly determining 1214, for each at least one additional symbol, if a bonus feature should be awarded, where the bonus feature is eligible to include a feature output that is ineligible to be presented during the base game.

FIG. 20 illustrates an example method 1300 of electronic gaming. In the example embodiment, method 1300 includes providing 1302 a set of displayed symbols (e.g., symbols 504) as output for a base game that includes a first subset of symbols associated with respective first output amounts.

In the example embodiment, method 1300 also includes determining 1304 that a first trigger condition is satisfied based on a threshold number of symbols (e.g., COR symbols 514) being in the first subset of symbols.

In the example embodiment, method 1300 also includes, in response to the first trigger condition being satisfied, causing 1306 a bonus game to be initiated.

In the example embodiment, method 1300 also includes providing 1308 a set of displayed symbols (e.g., symbols 604) of the bonus game that includes a second subset of symbols, the second subset of symbols including the first subset of symbols and at least one additional symbol (e.g., at least one additional COR symbol 618), where each at least one additional symbol is associated with a respective first output amount.

In the example embodiment, method 1300 also includes determining 1310 that a second trigger condition is satisfied based on the at least one additional symbol being in the set of displayed symbols of the bonus game.

In the example embodiment, method 1300 also includes, in response to the second trigger condition being satisfied, randomly determining 1312, for each at least one additional symbol, if an upgrade should be awarded.

In the example embodiment, method 1300 also includes, in response to determining that an upgrade should be awarded for at least one symbol of the at least one additional symbol, randomly determining 1314 an upgrade.

In the example embodiment, method 1300 also includes causing 1316 at least one symbol of the second subset of symbols to be upgraded from being associated with the respective first output amount to being associated with a respective second output amount based on the randomly determined upgrade, where the respective second output amount is greater than the respective first output amount.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g., an EEPROM). Further, different parts of the computer software can be executed by different devices, such as, for example, in a client-server relationship. Persons skilled in the art will appreciate that computer software provides a series of instructions executable by the processor.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:

at least one memory device for storing computer executable instructions; and at least one processor in communication with the at least one memory device, wherein the instructions, when executed by the at least one processor, cause the at least one processor to:

cause display of an adjustable game play matrix comprising a plurality of columns and a plurality of reels, each reel of the plurality of reels being an adjustable display position for displaying symbols of various size, wherein a first column of the plurality of columns comprises a first predefined number of reels, and wherein the plurality of columns comprise a fixed height;

randomly determine a first number of symbols to display on the first column for a first instance of an electronic game, wherein the first number of symbols is different from the first predefined number of reels;

randomly determine a first plurality of symbols corresponding to the first number of symbols, wherein each symbol of the first plurality of symbols is independently determined;

perform at least one lookup in at least one lookup table stored in the at least one memory to retrieve a sized first plurality of symbols, the sized first plurality of symbols being a first size, of a plurality of sizes, for each symbol of the first plurality of symbols, wherein the first size corresponds to the first number of symbols, and wherein the first plurality of symbols are stored in each of the plurality of sizes in the at least one lookup table;

randomly determine to split a symbol of the first plurality of symbols into two or more sub-symbols;

randomly determine the two or more sub-symbols;

adjust display of the reels on the first column by adjusting a height of a first number of the first predefined number of reels to be sized to receive the sized first plurality of symbols; and cause display of the sized first plurality of symbols at the first number of the first predefined number of reels in the plurality of columns comprising the fixed height, the sized first plurality of symbols comprising the two or more sub-symbols replacing the symbol.

2. The electronic gaming device of claim 1, wherein the instructions, when executed by the at least one processor, further cause the at least one processor to:

randomly determine a second number of symbols to display on the first column for a next instance of the electronic game, wherein the second number of symbols is different from the first number of the first predefined number of reels;

randomly determine a second plurality of symbols corresponding to the second number of symbols, wherein each symbol of the second plurality of symbols is independently determined;

select a second size, of the plurality of sizes, for each symbol of the second plurality of symbols to generate a sized second plurality of symbols, wherein the second size corresponds to the second number of symbols;

adjust display of the reels in the first column by adjusting a height of a second number of the first predefined number of reels to receive the sized second plurality of symbols; and cause display of the sized second plurality of symbols at the second number of the first predefined number of reels.

3. The electronic gaming device of claim 1, wherein a second column of the adjustable game play matrix comprises a second predefined number of reels, and wherein the instructions, when executed by the at least one processor, further cause the at least one processor to:

randomly determine a second number of symbols to display on the second column for the first instance of the electronic game, wherein the second number of symbols is different from the second predefined number of reels;

randomly determine a second plurality of symbols corresponding to the second number of symbols, wherein each symbol of the second plurality of symbols is independently determined;

select a second size, of the plurality of sizes, for each symbol of the second plurality of symbols to generate a sized second plurality of symbols, wherein the second size corresponds to the second number of symbols;

adjust display of the reels in the second column by adjusting a height of a first number of the second predefined number of reels to receive the sized second plurality of symbols; and cause display of the sized second plurality of symbols at the first number of the second predefined number of reels.

4. The electronic gaming device of claim 3, wherein the first and second columns have the fixed height and each display different numbers of symbols.

5. The electronic gaming device of claim 3, wherein each of the first and second columns is displayed with the fixed height during the electronic game.

6. The electronic gaming device of claim 1, wherein the plurality of sizes includes four sizes, and wherein each size corresponds to a number of symbols displayed in the first column.

7. The electronic gaming device of claim 1, wherein each size of the plurality of sizes includes a different symbol height.

8. The electronic gaming device of claim 1, wherein the display of the reels is adjusted instantaneously.

9. At least one non-transitory computer-readable storage medium with instructions stored thereon that, in response to execution by at least one processor, cause the at least one processor to:

cause display of an adjustable game play matrix comprising a plurality of columns and a plurality of reels, each reel of the plurality of reels being an adjustable display position for displaying symbols of various size, wherein a first column of the plurality of columns comprises a first predefined number of reels, and wherein the plurality of columns comprise a fixed height;

randomly determine a first number of symbols to display on the first column for a first instance of an electronic game, wherein the first number of symbols is different from the first predefined number of reels;

randomly determine a first plurality of symbols corresponding to the first number of symbols, wherein each symbol of the first plurality of symbols is independently determined;

perform at least one lookup in at least one lookup table stored in the at least one non-transitory computer-readable storage medium to retrieve a sized first plurality of symbols, the sized first plurality of symbols being a first size, of a plurality of sizes, for each symbol of the first plurality of symbols, wherein the first size corresponds to the first number of symbols, and wherein the first plurality of symbols are stored in each of the plurality of sizes in the at least one lookup table;

randomly determine to split a symbol of the first plurality of symbols into two or more sub-symbols;

randomly determine the two or more sub-symbols;

adjust display of the reels on the first column by adjusting a height of a first number of the first predefined number of reels to be sized to receive the sized first plurality of symbols; and cause display of the sized first plurality of symbols at the first number of the first predefined number of reels in the plurality of columns comprising the fixed height, the sized first plurality of symbols comprising the two or more sub-symbols replacing the symbol.

10. The at least one non-transitory computer-readable storage medium of claim 9, wherein the instructions further cause the at least one processor to:

randomly determine a second number of symbols to display on the first column for a next instance of the electronic game, wherein the second number of symbols is different from the first number of the first predefined number of reels;

randomly determine a second plurality of symbols corresponding to the second number of symbols, wherein each symbol of the second plurality of symbols is independently determined;

select a second size, of the plurality of sizes, for each symbol of the second plurality of symbols to generate a sized second plurality of symbols, wherein the second size corresponds to the second number of symbols;

adjust display of the reels in the first column by adjusting a height of a second number of the first predefined number of reels to receive the sized second plurality of symbols; and cause display of the sized second plurality of symbols at the second number of the first predefined number of reels.

11. The at least one non-transitory computer-readable storage medium of claim 9, wherein a second column of the adjustable game play matrix comprises a second predefined number of reels, and wherein the instructions, when executed by the at least one processor, further cause the at least one processor to:

randomly determine a second number of symbols to display on the second column for the first instance of the electronic game, wherein the second number of symbols is different from the second predefined number of reels;

randomly determine a second plurality of symbols corresponding to the second number of symbols, wherein each symbol of the second plurality of symbols is independently determined;

select a second size, of the plurality of sizes, for each symbol of the second plurality of symbols to generate a sized second plurality of symbols, wherein the second size corresponds to the second number of symbols;

adjust display of the reels in the second column by adjusting a height of a first number of the second predefined number of reels to receive the sized second plurality of symbols; and cause display of the sized second plurality of symbols at the first number of the second predefined number of reels.

12. The at least one non-transitory computer-readable storage medium of claim 11, wherein the first and second columns have the fixed height and each display different numbers of symbols.

13. The at least one non-transitory computer-readable storage medium of claim 11, wherein each of the first and second columns is displayed with the fixed height during the electronic game.

14. The at least one non-transitory computer-readable storage medium of claim 9, wherein the plurality of sizes includes four sizes, and wherein each size corresponds to a number of symbols displayed in the first column.

15. The at least one non-transitory computer-readable storage medium of claim 9, wherein each size of the plurality of sizes includes a different symbol height.

16. The at least one non-transitory computer-readable storage medium of claim 9, wherein the display of the reels is adjusted instantaneously.

17. A method of electronic gaming implemented by at least one processor in communication with at least one memory, the method comprising:

causing display of an adjustable game play matrix comprising a plurality of columns and a plurality of reels, each reel of the plurality of reels being an adjustable display position for displaying symbols of various size, wherein a first column of the plurality of columns comprises a first predefined number of reels, and wherein the plurality of columns comprise a fixed height;

randomly determining a first number of symbols to display on the first column for a first instance of an electronic game, wherein the first number of symbols is different from the first predefined number of reels;

randomly determining a first plurality of symbols corresponding to the first number of symbols, wherein each symbol of the first plurality of symbols is independently determined;

performing at least one lookup in at least one lookup table stored in the at least one memory to retrieve a sized first plurality of symbols, the sized first plurality of symbols being a first size, of a plurality of sizes, for each symbol of the first plurality of symbols, wherein the first size corresponds to the first number of symbols, and wherein the first plurality of symbols are stored in each of the plurality of sizes in the at least one lookup table;

randomly determining to split a symbol of the first plurality of symbols into two or more sub-symbols;

randomly determining the two or more sub-symbols;

adjusting display of the reels on the first column by adjusting a height of a first number of the first predefined number of reels to be sized to receive the sized first plurality of symbols; and causing display of the sized first plurality of symbols at the first number of the first predefined number of reels in the plurality of columns comprising the fixed height, the sized first plurality of symbols comprising the two or more sub-symbols replacing the symbol.

18. The method of claim 17, wherein a second column of the adjustable game play matrix comprises a second predefined number of reels, and wherein the method further comprises:

randomly determining a second number of symbols to display on the second column for the first instance of the electronic game, wherein the second number of symbols is different from the second predefined number of reels;

randomly determining a second plurality of symbols corresponding to the second number of symbols, wherein each symbol of the second plurality of symbols is independently determined;

selecting a second size, of the plurality of sizes, for each symbol of the second plurality of symbols to generate a sized second plurality of symbols, wherein the second size corresponds to the second number of symbols;

adjusting display of the reels in the second column by adjusting a height of a first number of the second predefined number of reels to receive the sized second plurality of symbols; and causing display of the sized second plurality of symbols at the first number of the second predefined number of reels.

19. The electronic gaming device of claim 1, wherein the instructions, when executed by the at least one processor, further cause the at least one processor to cause display of an animation splitting a reel where the two or more sub-symbols will be displayed into two or more sub-reels.

* * * * *